United States Patent
Kim et al.

(10) Patent No.: US 9,508,259 B2
(45) Date of Patent: Nov. 29, 2016

(54) WEARABLE DEVICE AND METHOD OF CONTROLLING THE SAME

(71) Applicant: LG ELECTRONICS INC., Seoul (KR)

(72) Inventors: Jihyun Kim, Seoul (KR); Hyeoncheol Lee, Seoul (KR); Kiho Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/827,446

(22) Filed: Aug. 17, 2015

(65) Prior Publication Data

US 2016/0046285 A1    Feb. 18, 2016

(30) Foreign Application Priority Data

Aug. 18, 2014 (KR) .................... 10-2014-0106887

(51) Int. Cl.
| | |
|---|---|
| G01G 1/16 | (2006.01) |
| G08G 1/133 | (2006.01) |
| B62D 15/02 | (2006.01) |
| G05D 1/00 | (2006.01) |
| G08G 1/14 | (2006.01) |

(52) U.S. Cl.
CPC ............ *G08G 1/133* (2013.01); *B62D 15/027* (2013.01); *G05D 1/0016* (2013.01); *G08G 1/144* (2013.01)

(58) Field of Classification Search
CPC ...................................................... G08G 1/168
USPC ...................................................... 340/932.2
See application file for complete search history.

(56) References Cited

U.S. PATENT DOCUMENTS

| | | | | |
|---|---|---|---|---|
| 2013/0135118 A1* | 5/2013 | Ricci | .................. | G06F 9/54 340/932.2 |
| 2016/0117925 A1* | 4/2016 | Akavaram | ............ | B60W 40/09 340/932.2 |

FOREIGN PATENT DOCUMENTS

| | | |
|---|---|---|
| JP | 2005-004414 A | 1/2005 |
| JP | 2006-282116 | 10/2006 |
| JP | 2008-062852 A | 3/2008 |
| KR | 10-2006-0066822 A | 6/2006 |
| KR | 10-2011-0105124 A | 9/2011 |

OTHER PUBLICATIONS

Korean Notice of Allowance dated Aug. 25, 2015 for Korean Application No. 10-2014-0106887, 6 pages.
International Search Report and Written Opinion in International Application No. PCT/KR2015/008040, mailed Nov. 20, 2015, 9 pages.

* cited by examiner

*Primary Examiner* — Kevin Kim
(74) *Attorney, Agent, or Firm* — Fish & Richardson P.C.

(57) ABSTRACT

Provided is a wearable device including: a biological-signal sensing unit that senses a biological signal of a user; a vehicle-state sensing unit that senses a state where a vehicle that the user gets in is moved; and a controller that determines a parking mode and a parking direction using a result of the sensing by the vehicle-state sensing unit, when the vehicle is parked, and that measures a level of user tension for the parking mode and the parking direction that are determined using the biological signal that is sensed while the vehicle is being parked, in which the controller selects the parking mode and the parking direction that the user prefers, based on the measured level of user tension, and provides the user with information relating to a parking lot where the vehicle is able to be parked in the parking mode and the parking direction that are selected.

20 Claims, 14 Drawing Sheets

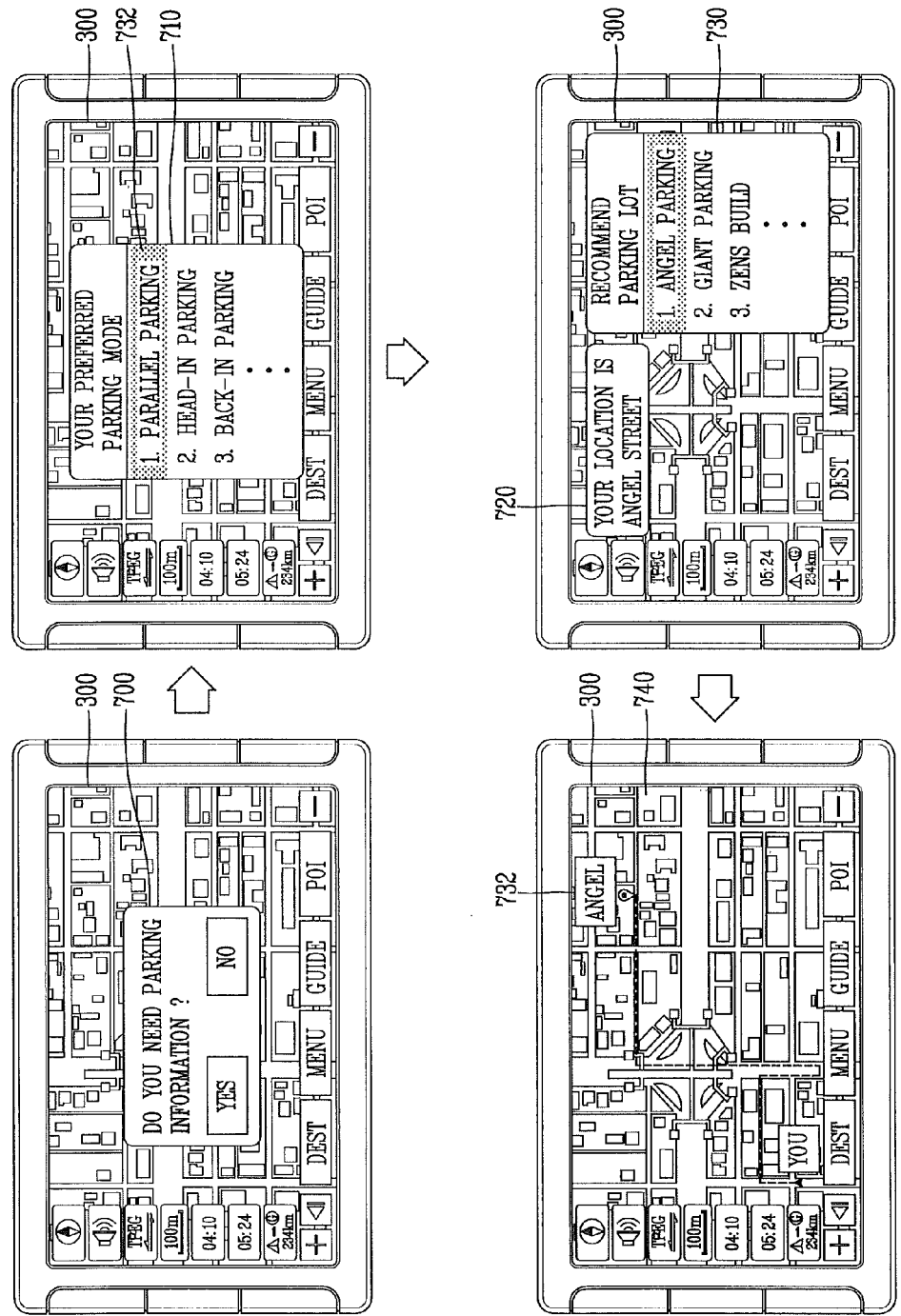

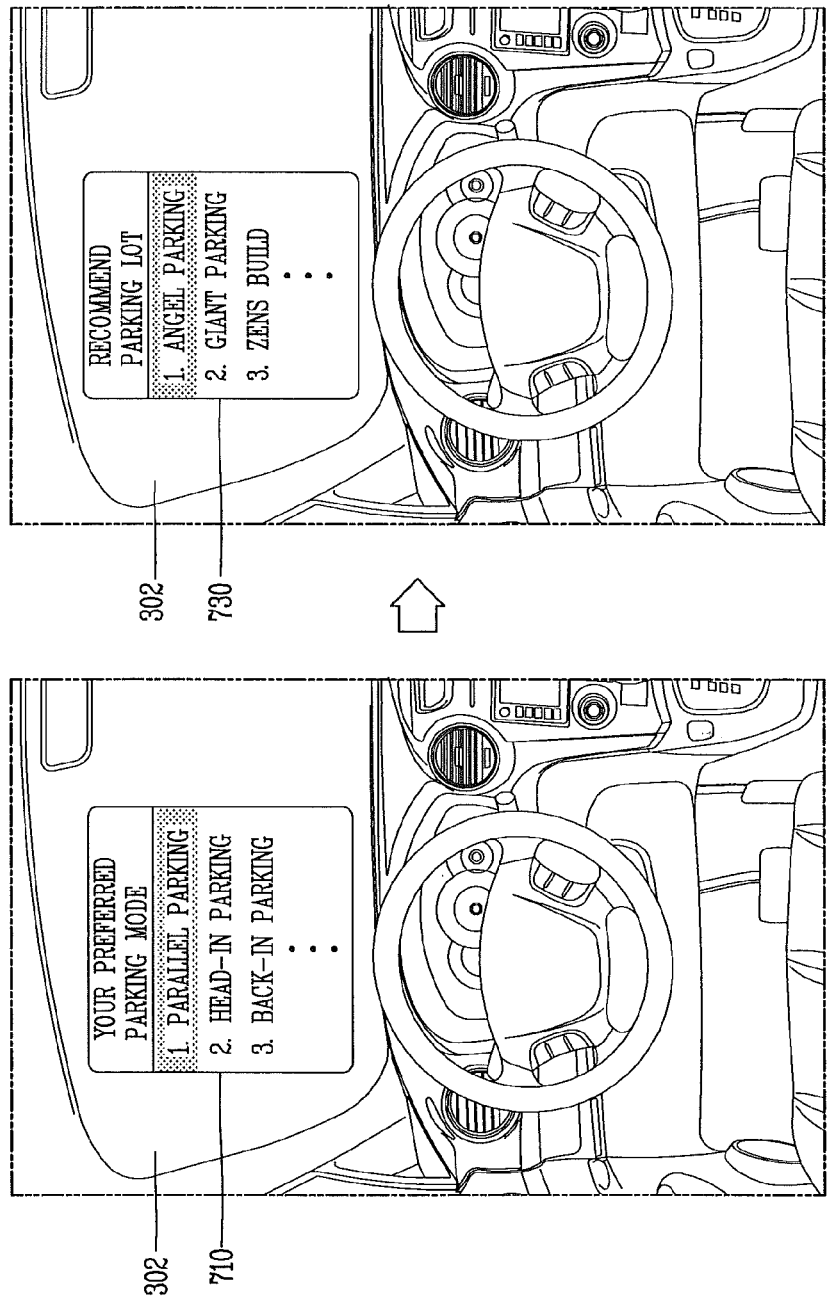

WEARABLE DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2014-0106887, filed on Aug. 18, 2014, the contents of which is incorporated by reference herein in its entirety.

BACKGROUND OF THE DISCLOSURE

1. Field of the Disclosure

The present disclosure relates to a wearable device capable of sensing various states of a user's body and a method of control the wearable device.

2. Background of the Disclosure

Wearable devices include various types of electronic devices that are wearable on a user's body or user's clothes. The wearable devices include, for example, a smartwatch, a wearable computer, a google glass, a Bluetooth headset, and a smart wear.

As described above, the wearable devices are wearable on the user's body or the user's clothes. Accordingly, in a case where a driver of a vehicle wears the wearable device, various states of the user's body associated with a driving state of the vehicle are measured. A tremendous amount of research has been devoted to utilization of advantages of the wearable device to provide the user with greater convenience.

SUMMARY OF THE DISCLOSURE

Therefore, an aspect of the detailed description is to provide a wearable device capable of providing a driver with information relating to a parking lot where a vehicle can be parked more easily and a method of controlling the wearable device.

Another aspect of the detailed description is to provide a wearable device capable of recognizing a parking mode and a parking direction that a user feels comfortable with and providing the user with information relating to a parking lot in accordance with the parking mode and the parking direction that are recognized, and a method of controlling the wearable device.

To achieve these and other advantages and in accordance with the purpose of this specification, as embodied and broadly described herein, there is provided a wearable device including: a biological-signal sensing unit that senses a biological signal of a user; a vehicle-state sensing unit that senses a state where a vehicle that the user gets in is moved; and a controller that determines a parking mode and a parking direction using a result of the sensing by the vehicle-state sensing unit, when the vehicle is parked, and that measures a level of user tension for the parking mode and the parking direction that are determined using the biological signal of the user that is sensed while the vehicle is being parked, in which the controller selects the parking mode and the parking direction that the user prefers, based on the measured level of user tension, and provides the user with information relating to a parking lot where the vehicle is able to be parked in the parking mode and the parking direction that are selected.

The wearable device may further include a location sensing unit that senses a current location of the user, in which at the request of the user, the controller may provide the user with the information relating to the parking lot where the vehicle is able to be parked, based on the current location of the user.

In the wearable device, the information relating to the parking lot where the vehicle is able to be parked may information relating to at least one parking lot that is determined by the number of times that other drivers recommend at least the one parking lot as a parking lot suitable for the parking mode and the parking direction that are selected, among the parking lots where the vehicle is able to be parked, which are located around the sensed current location.

In the wearable device, the information relating to the parking lot where the vehicle is able to be parked may be information relating to at least one parking lot that is determined by the number of spaces where the vehicle is able to be parked in the parking mode and the parking direction that are selected, among the parking lots where the vehicle is able to be parked, which are located around the sensed current location.

In the wearable device, the information relating to the parking lot where the vehicle is able to be parked may be information relating to at least one parking lot that is determined based on whether or not the vehicle is able to be parked in the parking mode and the parking direction that are selected, and on a distance from the sensed current location to at least the one parking lot, among the parking lots where the vehicle is able to be parked, which are located around the sensed current location.

In the wearable device, the information relating to the parking lot where the vehicle is able to be parked may be at least one piece of information that is selected based on the parking mode and the parking direction that are selected, among multiple pieces of information relating to the parking lot that are collected from a predetermined external server.

In the wearable device, the biological-signal sensing unit may sense at least one among a heart rate of, a body temperature of, and an amount of flowing blood of the user, and the controller may measure the level of user tension for the parking mode and the parking direction in which the vehicle is parked, based on a change in the heart rate of, the body temperature of, or the amount of flowing blood of the user that is sensed while the vehicle is being parked.

In the wearable device, in a case where at least one, among the heart rate of, the body temperature of, or the amount of flowing blood of the user that are sensed, is changed by a predetermined numerical value or greater, the controller may determine that the user is under tension, and may measure the level of user tension, based on a difference between at least the one, among the heart rate of, the body temperature of, and the amount of flowing blood of the user that are sensed, and the predetermined numerical value.

In the wearable device, the controller may compare at least the one, among the heart rate of, the body temperature of, and the amount of flowing blood of the user that are sensed, with an average value that is normally measured and thus determines whether or not the user is under tension, and the controller may measure the level of user tension, based on a difference between at least the one, among the heart rate of, the body temperature of, and the amount of flowing blood of the user that are sensed, and the average value.

In the wearable device, the controller may categorize results of measuring the level of user tension into multiple different parking modes and multiple different parking directions, may calculate an average level of user tension for each of the multiple different parking modes and each of the multiple different parking directions, based on the number of times that the vehicle is parked, and may determine that the lower the calculated average level of user tension, the more the parking mode and the parking direction associated with the calculated average level of user tension the user prefers.

In the wearable device, in a case where the number of times that the vehicle is parked in a specific parking mode and a specific parking direction is smaller, by a predetermined numerical value or greater, than in the other parking modes and the other parking directions, the controller may determine that the user avoids the specific parking mode and the specific parking direction.

In the wearable device, the controller may provide the user with information relating to a parking lot where the vehicle is parked in the parking mode and the parking direction that are determined as the parking mode and the parking direction that the user prefers, using past parking history information on the vehicle.

In the wearable device, the information that is provided to the user may include information on a path to at least one parking lot where the vehicle is able to be parked.

In the wearable device, the controller may display the information relating to the parking lot where the vehicle is able to be parked, in the form of video information, on a unit connected to the vehicle, on which the video information is able to be displayed.

In the wearable device, the controller may display the video information relating to the parking lot where the vehicle is able to be parked, on a display unit provided within the vehicle or on a windshield glass of the vehicle.

In the wearable device, the controller may determine whether or not the user is a driver of the vehicle, and, in a case where it is determined that the user is the driver of the vehicle, may measure the level of user tension for the parking mode and the parking direction in which the vehicle is parked.

In the wearable device, the controller may determine whether or not the user is the driver of the vehicle, based on a result of recognizing a face through a camera provided within the vehicle, or on a result of recognizing a position of a vehicle seat that the user sits down on.

In the wearable device, in a case where the vehicle is a vehicle of which a designated drive is the user, when the user gets in the vehicle, the controller may determine that the user is the driver of the vehicle.

In the wearable device, based on user selection, the controller may transmit information on user's recommendation of the parking lot where the vehicle is currently parked, to a predetermined external server.

To achieve these and other advantages and in accordance with the purpose of this specification, as embodied and broadly described herein, there is provided a method of controlling a wearable device that senses a biological signal of a user, the method including: determining a parking mode and a parking direction, based on a moved state of a vehicle when the vehicle is parked; measuring a level of user tension for the parking mode and the parking direction that are determined, based on the biological signal of the user that is sensed while the vehicle is being parked; determining a level of user reference for each of the multiple different parking modes and each of the multiple different parking directions, using the level of user tension that is measured based on each of the parking modes and each of the parking directions; selecting the parking mode and the parking direction that the user prefers, from among the parking modes and from among parking directions, based on a result of the determination; and providing the user with information relating to a parking lot where the vehicle is able to be parked in the parking mode and the parking direction that the user prefers, among parking lots around a current location of the user, at the request of the user.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 7A is a diagram illustrating an example in which according to the embodiment of the present invention, the information relating to the parking lot is displayed;

FIG. 7B is a diagram illustrating another example in which according to the embodiment of the present invention, the information relating to the parking lot is displayed;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
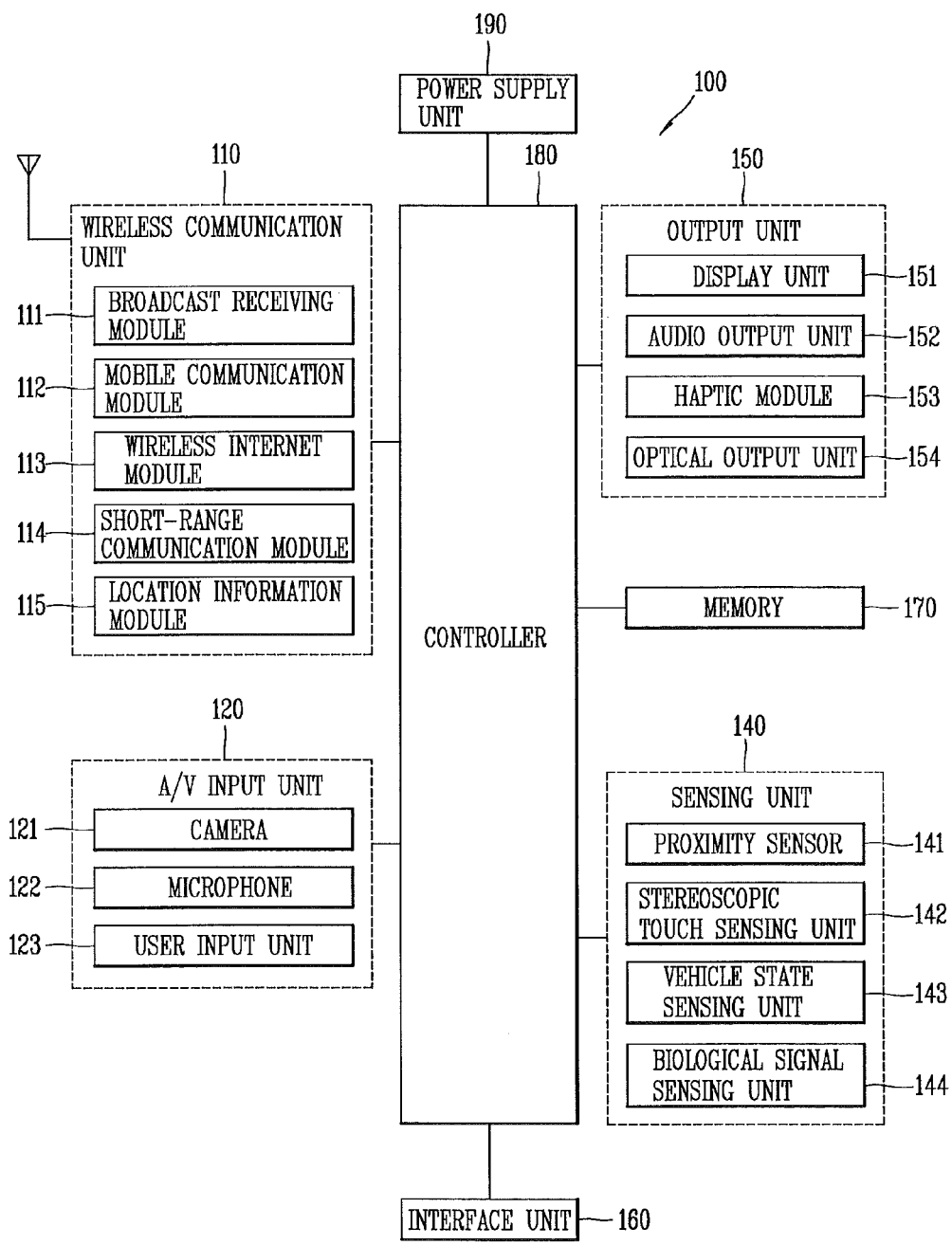
FIG. 1 is a diagram for describing a wearable device according to the present invention.

FIG. 1 is a diagram for describing a wearable device according to the present invention, As shown in FIG. 1, the wearable device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1 is not a requirement, and that greater or fewer components may alternatively be implemented.

Referring now to FIG. 1, the wireless communication unit 110 typically includes one or more modules which permit communications such as wireless communications between the wearable device 100 and a wireless communication system, communications between the wearable device 100 and another mobile terminal, communications between the wearable device 100 and an external server. Further, the wireless communication unit 110 typically includes one or more modules which connect the wearable device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The wearable device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the wearable device 100 and a user, as well as function as the user input unit 123 which provides an input interface between the wearable device 100 and the user.

The interface unit 160 serves as an interface with various types of external devices that can be coupled to the wearable device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the wearable device 100 may perform assorted control functions associated with a connected external device, in response to the external device being connected to the interface unit 160.

The memory 170 is typically implemented to store data to support various functions or features of the wearable device 100. For instance, the memory 170 may be configured to store application programs executed in the wearable device 100, data or instructions for operations of the wearable device 100, and the like. Some of these application programs may be downloaded from an external server via wireless communication. Other application programs may be installed within the wearable device 100 at time of manufacturing or shipping, which is typically the case for basic functions of the wearable device 100 (for example, receiving a call, placing a call, receiving a message, sending a message, and the like). It is common for application programs to be stored in the memory 170, installed in the wearable device 100, and executed by the controller 180 to perform an operation (or function) for the wearable device 100.

The controller 180 typically functions to control overall operation of the wearable device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the wearable device 100. The power supply unit 190 may include a battery, and the battery may be configured to be embedded in the terminal body, or configured to be detachable from the terminal body.

Hereinafter, components of a wearable device 100 will be explained in more detail with reference to FIG. 1, before various embodiments are explained.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the wearable device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the wearable device 100 and a wireless communication system, communications between the wearable device 100 and another wearable device 100, or communications between the wearable device and a network where another wearable device 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the wearable device uses a GPS module, a position of the wearable device may be acquired using a signal sent from a GPS satellite. As another example, when the wearable device uses the Wi-Fi module, a position of the wearable device can be acquired based on information related to a wireless access point (AP) which transmits or receives a wireless signal to or from the Wi-Fi module.

The input unit 120 may be configured to permit various types of input to the wearable device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the wearable device 100. As another example, the cameras 121 may be located in a stereoscopic arrangement to acquire left and right images for implementing a stereoscopic image.

The microphone 122 is generally implemented to permit audio input to the wearable device 100. The audio input can be processed in various manners according to a function being executed in the wearable device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the wearable device 100. The user input unit 123 may include one or more of a mechanical input element (for example, a key, a button located on a front and/or rear surface or a side surface of the wearable device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the wearable device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the wearable device 100 or execute data processing, a function or an operation associated with an application program installed in the wearable device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the wearable device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the wearable device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the wearable device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal. On the other hand, the sensing unit 140 according to the embodiment of the present invention may further include a biological-signal sensing unit 144 for sensing a biological signal of the user. At this point, the biological-signal sensing unit 144 checks a heart rate, a body temperature, and an amount of flowing blood of the user who wears the wearable device 100, for a change in each of them.

In addition, in a case where the user is a driver of a predetermined vehicle, the sensing unit 140 of the wearable device 100 according to the present invention senses this and switches to a vehicle-connected state in which the vehicle is connected to the wearable device 100 for operation in conjunction with the wearable device 100. When the vehicle is in the vehicle-connected state, the sensing unit 140 senses various piece of information relating to movements of the vehicle. In this case, the sensing unit 140 collects information relating to a current moving direction or a current moving state of the vehicle through a vehicle control unit of the vehicle that is connected to the wearable device 100. Based on the collected pieces of information, the sensing unit 140 senses whether or not the vehicle is currently parked, which mode of a parallel parking mode, a perpendicular parking mode, and an angle parking mode the vehicle is parked in, or whether the vehicle is parked in a head-in direction or in a back-in direction. A sensor of the sensing unit 140, which senses a vehicle-parked state, and a vehicle parking mode, and a vehicle parking direction, is hereinafter referred to as a "vehicle-state sensing unit 143."

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the wearable device 100. For example, the display unit 151 may display execution screen information of an application program executing at the wearable device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the wearable device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the wearable device 100.

An optical output module 154 can output a signal for indicating an event generation using light of a light source. Examples of events generated in the wearable device 100 may include message reception, call signal reception, a missed call, an alarm, a schedule notice, an email reception, information reception through an application, and the like.

A signal output by the optical output module 154 may be implemented in such a manner that the wearable device emits monochromatic light or light with a plurality of colors. The signal output may be terminated as the wearable device senses that a user has checked the generated event, for example.

The interface unit 160 serves as an interface for external devices to be connected with the wearable device 100. For example, the interface unit 160 can receive data transmitted from an external device, receive power to transfer to elements and components within the wearable device 100, or transmit internal data of the wearable device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the wearable device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the wearable device 100 is connected with an external cradle, the interface unit 160 can serve as a passage to allow power from the cradle to be supplied to the wearable device 100 or may serve as a passage to allow various command signals input by the user from the cradle to be transferred to the wearable device there through. Various command signals or power input from the cradle may operate as signals for recognizing that the wearable device is properly mounted on the cradle.

The memory 170 can store programs to support operations of the controller 180 and store input/output data (for example, phonebook, messages, still, images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The wearable device 100 may also be operated in relation to a network storage device that performs the storage function of the memory 170 over a network, such as the Internet.

The controller 180 may typically control the general operations of the wearable device 100. For example, the controller 180 may set or release a lock state for restricting a user from inputting a control command with respect to applications when a status of the wearable device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

On the other hand, in the case where the user who wears the wearable device 100 is a driver of a predetermined vehicle, the controller 180 of the wearable device 100 according to the present invention senses this. For example, in a case where the user gets in a specific vehicle of which a designated driver is the user himself/herself, the controller 180 determines that the driver drives the vehicle. Alternatively, based on a result of sensing a position of the wearable device 100 within the vehicle, the controller 180 may recognize which of vehicle seats the user who wears the wearable device 100 sits down on and, based on the recognized seat, may determine that the user is the driver of the vehicle. Alternatively, according to a result of recognizing a face of the user using a camera provided within the vehicle, the controller 180 determines whether or not the user is a driver who currently drives the vehicle.

Then, in the case where the user is the driver of the vehicle, the controller 180 of the wearable device 100 according to the present invention measures a level of user tension, by sensing the biological signal of the user. For example, the controller 180 senses the changes in the heart rate, the body temperature, the amount, and the like of flowing blood of the user using a result of the sensing by the sensing unit 140, and, through the use of this, determines whether or not the user is in a tense state. Then, in a case where the vehicle is currently parked as a result of the sensing by the vehicle-state sensing unit 143, the controller 180 measures the level of tension that results from the mode and the direction in which the vehicle is currently parked, based on the result of the sensing by the biological-signal sensing unit 144.

In this manner, the controller 180 measures the level of user tension while the vehicle is being parked in each of the vehicle parking mode, based on the result of sensing the biological signal of the user. Then, the controller 180 determines which parking mode and which parking direction the user feels comfortable with, based on the measured level of tension. In this case, the controller 180 may provide the user with various pieces of information relating to the parking mode and the parking direction that the user feels most comfortable with.

At this point, the various pieces of information relating to the parking mode and the parking direction are pieces of information relating to a parking lot. For example, at the request of the user, the controller 180 provides the user with the information relating to the parking lot, where the vehicle can be parked in the parking mode that the user feels most comfortable with. At this point, the information relating to the parking lot is one piece of information among pieces of information relating to the parking lots where the user has parked in the past, or is a pieces of information relating to the parking lot where the user can park the vehicle in the parking mode and the parking direction that the user feels most comfortable with, among the multiple pieces of information that are collected from an external server and the like. To do this, the controller 180 is connected to at least one external server. The external server collects the pieces of information relating to the parking lot, using a crowdsourcing method or collects, or collects the pieces of information relating to the parking lot from various companies that are engaged in doing parking business.

On the other hand, the controller 180 provides the user with the pieces of information relating to the parking lot in various ways. For example, the controller 180 provides the user with the information relating to the parking lot, in the form of video information that is displayed on a display unit 251. Alternatively, the controller 180 may display the information relating to the parking lot on a display unit provided within the vehicle, which is connected to the vehicle control unit, or on a windshield glass of the vehicle, using a head-up display (HUD) method.

The power supply unit 190 receives external power or provide internal power and supply the appropriate power required for operating respective elements and components included in the wearable device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The wearable device 100 may include a smart watch, a smart glass, a head mounted display (HMD), etc.

For instance, a mobile terminal can exchange data with the wearable device 100. The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
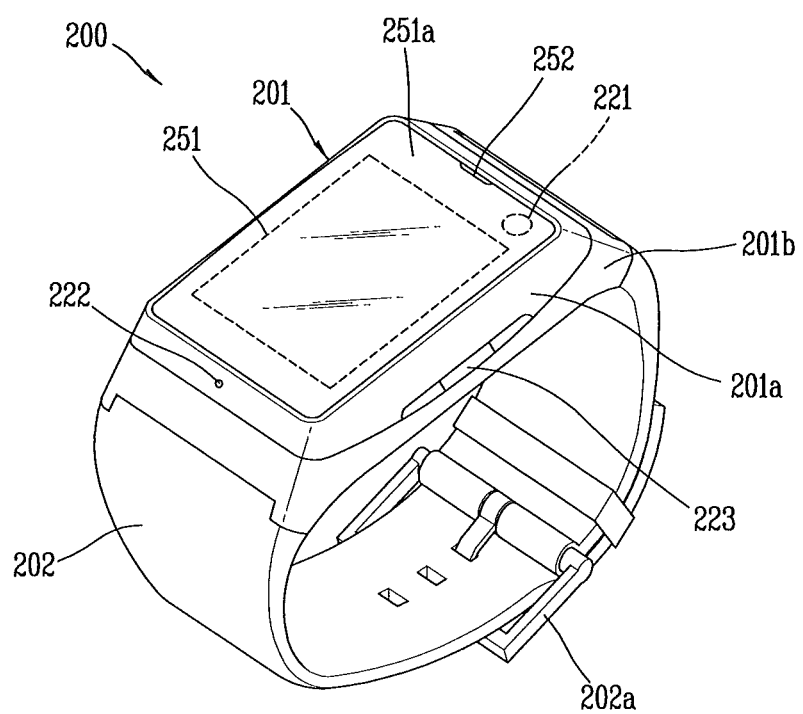
FIG. 2 is a perspective diagram illustrating one example of a watch-type wearable device according to the present invention.

FIG. 2 is a perspective view illustrating one example of a watch-type wearable device 200 in accordance with another exemplary embodiment.

As illustrated in FIG. 2, the watch-type wearable device 200 includes a main body 201 with a display unit 251 and a band 202 connected to the main body 201 to be wearable on a wrist. In general, wearable device 200 may be configured to include features that are the same or similar to that of wearable device 100 of FIG. 1.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a wearable device 200 with a uni-body.

The watch-type wearable device 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Figure 3A:
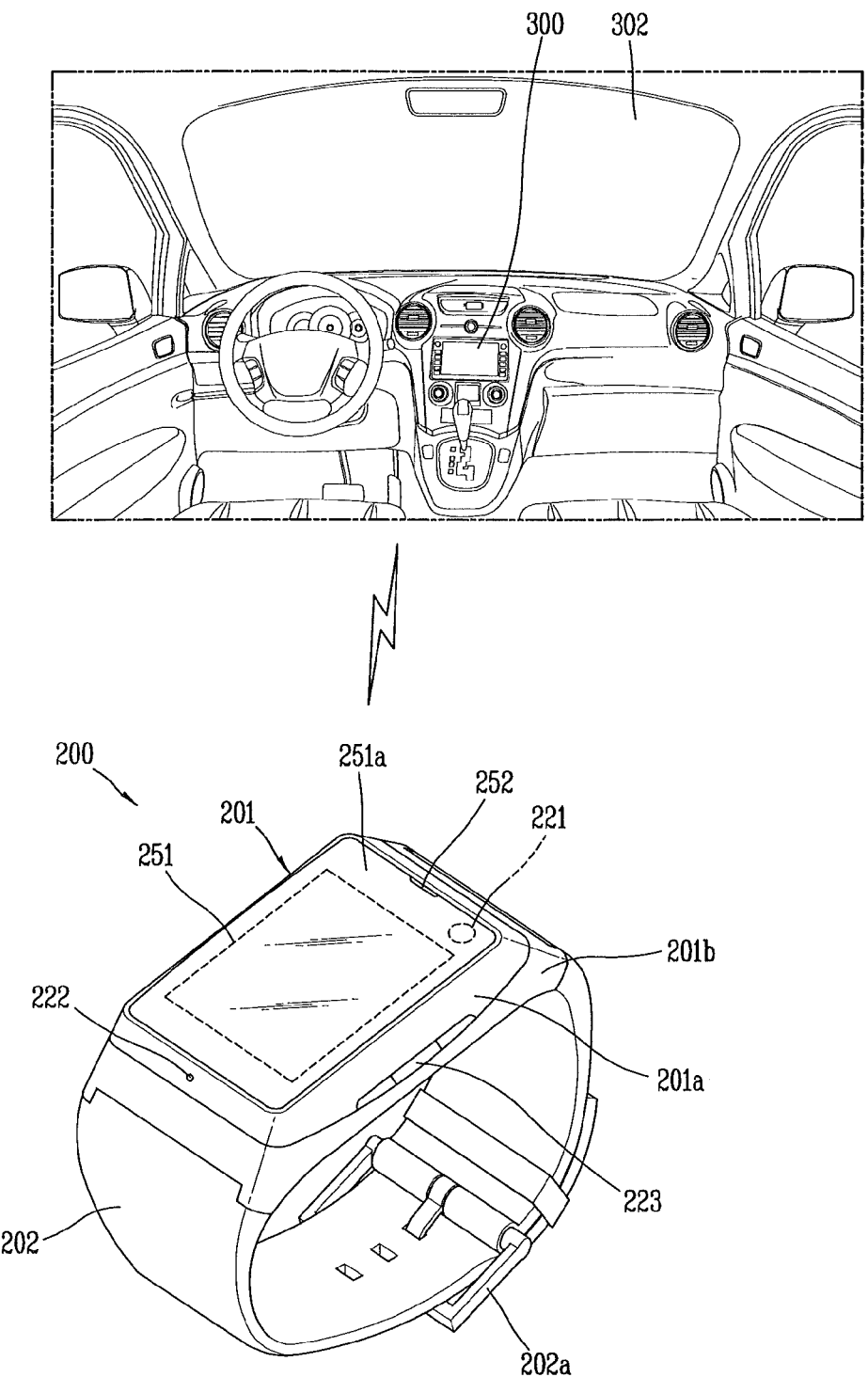
FIG. 3A is a diagram illustrating an example in which the wearable device according to the present invention operates in conjunctional with a vehicle.

On the other hand, FIG. 3A is a diagram illustrating an example in which the wearable device according to the present invention operates in conjunctional with the vehicle.

Referring to FIG. 3A, wearable device 200 is connected to the vehicle control unit (not illustrated) in a wired or wireless manner, and request the vehicle control unit to execute a specific function. A state where the vehicle is connected in this manner to the wearable device 200 for operation in conjunction with the wearable device 200 is hereinafter referred to as the "vehicle-connected state."

In this manner, when the vehicle is in the "vehicle-connected state," the wearable device 200 transmits video information, audio information, and/or the like that are output from the wearable device 200, to an audio/video (AN) output device provided within the vehicle, through a predetermined interface. Then, the video information, the audio information, and/or the like that are transmitted to the A/V output device is output through a display unit 300 and/or an audio system (not illustrated). At this point, interfacing units for transmitting the video information and/or the audio information include, for example, an interfacing unit that supports wireless communication, such as a Wireless Fidelity (WiFi) transmitting and receiving unit and a Bluetooth transmitting and receiving unit, and an interfacing unit that supports wired communication, such as a Universal Serial Bus (USB) terminal.

On the other hand, when the vehicle is in the "vehicle-connected state," the wearable device 200 enables at least one, among functions that are executable on the vehicle, to be executed on the vehicle. For example, the wearable device 200 may enable the video information, which is output to the display unit 251, to be displayed on the display unit 300 provided within the vehicle or on a windshield glass 302 using the head-up display (HUD) method. Alternatively, through an interface that is displayed on the display unit 251 of the wearable device 200, the user can perform control in such a manner that an window of the vehicle or specific music data is reproduced. In addition, navigation information relating to a predetermined specific point may be displayed on the display unit 300 of the vehicle.

Figure 3B:
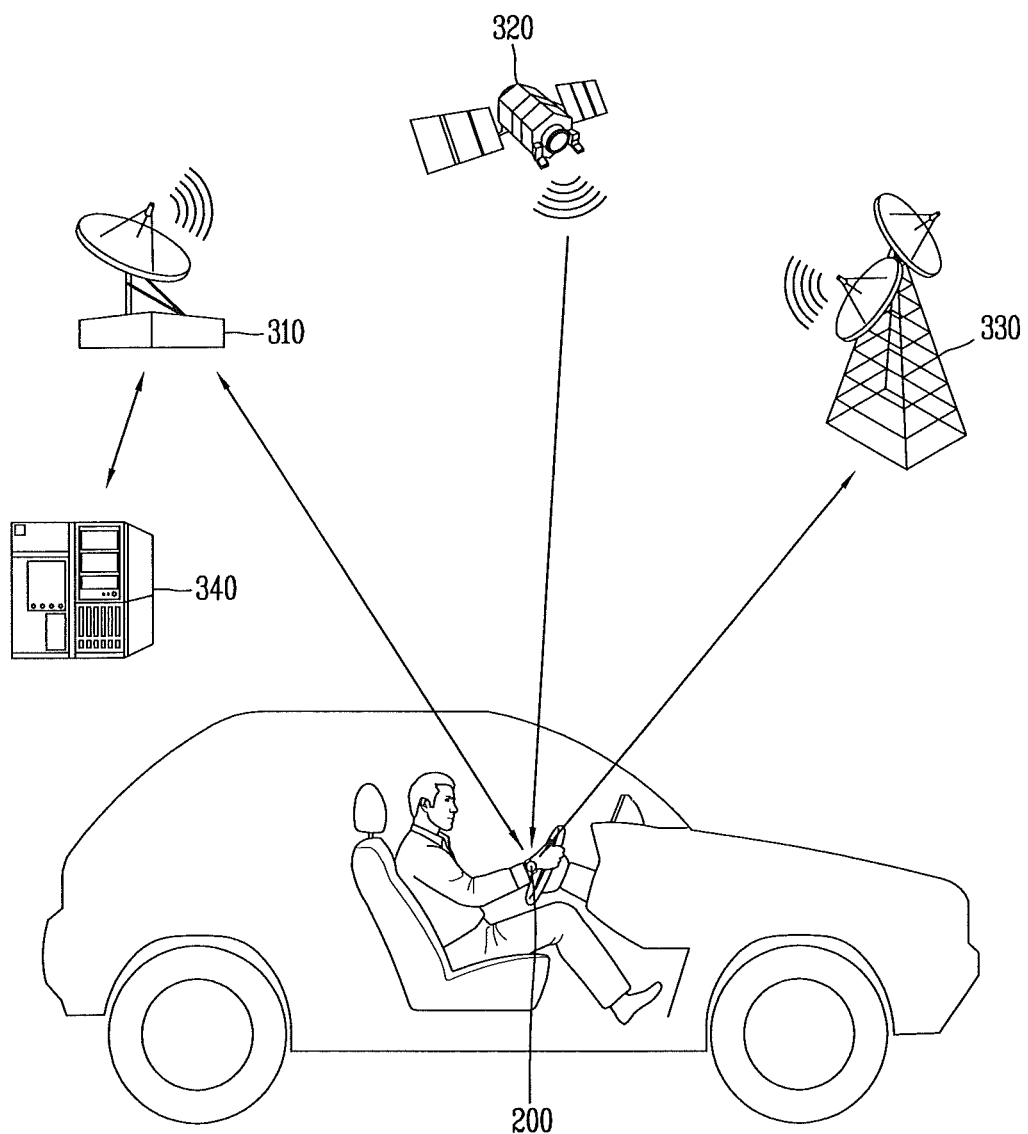
FIG. 3B is a block diagram illustrating an example in which the wearable device according to the embodiment of the present invention collects information relating to a parking lot.

FIG. 3B is a block diagram illustrating an example in which a smartwatch according to the embodiment of the present invention collects the information relating to the parking lot.

As illustrated in FIG. 3B, the wearable device 200 receives traffic information from an information service center 340 that provides the traffic information and various type of data (for example, a program, an execution file, and the like) over a long-distance wireless communication network 310 and/or a short-distance wireless communication network, and provides a directions-suggestion service, based on a GPS signal received from a satellite 320 and on the traffic information. At this point, the networks may include wired or wireless communication networks such as the Local Area Network (LAN), and the Wide Area Network (WAN).

Various types of traffic information (for example, road traffic information or information on an interested place) such as signal light information are collected over the communication networks, and the collected pieces of information are transmitted to the wearable device 200. In addition to the signal light information, the pieces of traffic information include pieces of information on various traffic conditions necessary for road driving, ocean sailing, and air flight, such as accidents, road situations, traffic congestion, road construction, road blockade, public transportation delay, air flight delay, and the like.

On the other hand, the pieces of traffic information may be processed, in compliance with Transport Protocol Expert Group (TPEG) standards, in the information service center 340 (for example, a server), and may transmitted to a broadcasting station. Accordingly, the broadcasting station superimposes the traffic information, which includes the signal light information, onto a broadcasting signal, for broadcasting to a telematics terminal (not illustrated) of the vehicle. At this point, the signal light information may be received from a server (not illustrated) that is installed in a signal light pole, when the vehicle passes by the signal light pole.

The server may reconfigure various type of traffic information, which are collected from various sources connected to the communication network, for example, operator inputs, the wired and wireless Internet, digital broadcasting services, such as Transparent Data Channel (TDC) and Multimedia Object Transport (MOC), other servers, and probe cars, into a traffic information format for transmission to the broadcasting, for example, in accordance with Transport Protocol Expert Group (TPEG) standards, which are standards for a traffic information service. At this point, the server may generate the traffic information format in accordance with the TPEG standards, which includes the light signal information, for the transmission to the broadcasting station.

The broadcasting station superimposes the traffic information including the light signal information received from the server onto the broadcasting signal for wireless transmission, in such a manner that the telematics terminal, for example, a navigation apparatus, mounted into the vehicle or the like that serves as a terminal for receiving the traffic information receives the traffic information superimposed onto the broadcasting signal. Then, the telematics terminal receives the traffic information superimposed onto the broadcasting signal. According to the present invention the wearable device 200 may receive the traffic information from the telematics terminal.

On the other hand, the information service center 340 collects various pieces of information relating to the parking lot. For example, the information service center 340 collects pieces of information relating to parking lots where multiple drivers parked their vehicles from them over a long-distance wireless communication network 310. The collected pieces of information include pieces of information relating to geographical locations or sizes of such parking lots and pieces of information relating to the parking modes and the parking directions that are suitable in such parking lots.

That is, from the drivers, the information service center 340 collects pieces of information on which parking mode of the parallel parking mode, the perpendicular parking mode, an the angle parking mode the parking lots where the drivers parked their vehicles were suitable for, pieces of information on which direction of the head-in parking direction and the back-in parking direction the parking lots were suitable for, pieces of information relating to locations of the parking lots, pieces of information relating to sizes of the parking lots, pieces of information relating to vehicle-parking capacity of the parking lots, and the like. Alternatively, the information service center 340 collects the pieces of information (for example, information on a parking place) relating to the parking lot from companies that are engaged in parking business, or from different drivers, according to a region. Then, the information service center 340 may collect and store pieces of driver evaluation information on the parking lots.

Then, the information service center 340 categories the collected pieces of information relating to the parking lots by various references, and stores the categorized pieces of information. For example, the information service center 340 categorizes the collected pieces of information relating to the parking lots on a district basis, according to the region, the parking mode, and the parking direction. In this case, the pieces of information relating to the parking lots are arranged in decreasing order of a level of user recommendation for the parking lot in terms of the region, the parking mode, or the parking direction. At the request of the driver, pieces of information arranged in an orderly manner are transmitted to the wearable device 200 according to the embodiment of the present invention over the long-distance wireless communication network 310 or through a broadcasting station 330 or the satellite 320.

A control method that is realized in the wearable device with the configuration described above, according to embodiments of the present invention is described below referring to the accompanying drawings. It is apparent to a person of ordinary skill in the related art that modifications to the present invention are possible in the scope that does not depart from the nature and essence of, and the gist of the present invention.

Figure 4:
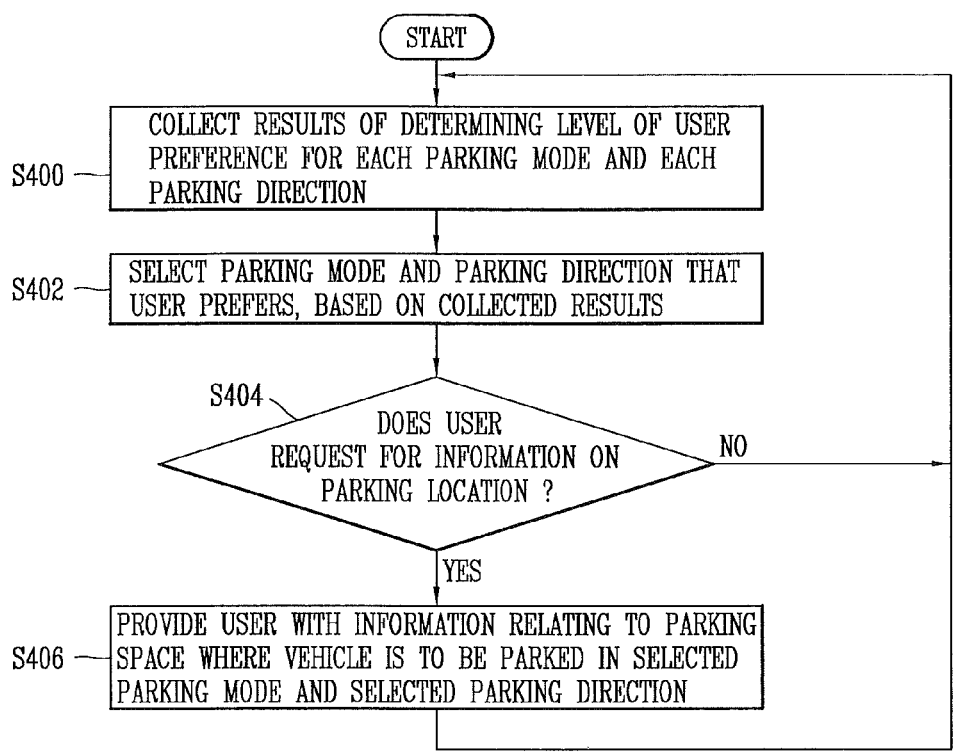
FIG. 4 is a flowchart illustrating an operational process that is performed by a smartwatch according to the present invention.

FIG. 4 is a flowchart illustrating an operational process that is performed by a smartwatch according to the present invention.

Referring to FIG. 4, the controller 180 of the wearable device 100 according to the present invention checks the biological signal of a wearer, that is, the user of the wearable device 100, using the sensors of the biological-signal sensing unit 144. It is more desirable that the controller 180 of the wearable device 100 according to the embodiment of the present invention should determine a moved state of a vehicle, using a result of the sensing by the vehicle-state sensing unit 143. Then, in a case where the vehicle is being park, the controller 180 measures a level of user preference for a current parking mode in which the vehicle is being parked, based on the biological signal of the user that is sensed while the vehicle is being parked (S400).

In Step S400, the controller 180 of the wearable device 100 according to the present invention senses a moved state of the vehicle in various ways. For example, the controller 180 senses a state where a location of the wearable device 100 is moved, and based on a result of the sensing, determines whether or not the user gets in the vehicle, or whether or not the vehicle that the user gets in is in a parked state. For example, in a case where as a result of sensing the state where the location of the wearable device 100 is moved, it is determined that the vehicle has been in a stationary state for a predetermined period of time, the controller 180 determines that the vehicle that the user gets in came to a stop.

Alternatively, the wearable device 100 according to the present invention may receive information relating to the moved state of the vehicle from the vehicle control unit and use the received information. That is, in a case where the vehicle is in the vehicle-connected state where the vehicle is connected to the wearable device 100, the vehicle-state sensing unit 143 of the wearable device 100 according to the present invention receives pieces of information relating to a direction in which the vehicle is moved, a speed at which the vehicle is moved, and the like from the vehicle control unit. Then, the vehicle-state sensing unit 143 determines whether a vehicle is currently driving or being parked, using the received information on the moved state of the vehicle.

Furthermore, in a state where it is determined that a vehicle that the user is in is being parked, the controller 180 may further determine the parking mode and the parking direction in which the vehicle is parked. For example, the controller 180 determines the parking mode and the parking direction in which the user parked the vehicle, based on at least one among operating of a steering wheel by the user, tracks of the vehicle that was parked, and a state where the vehicle was parked.

In a case where the parking mode and the parking direction in which the user parked the vehicle are determined in Step S400, the controller 180 determines the level of user preference for the current parking mode and the current parking direction in which the user parks the vehicle, based on the biological signal that is measured while the user is parking the vehicle. For example, the controller 180 senses a change in the biological signal of the user, such as body temperature, an amount of flowing blood, or a heart rate, and the like and thus determines a level of user tension while the vehicle is being parked. In this case, when the body temperature or the heart rate of the user increases while he/she is parking the vehicle, the controller 180 senses the biological signal indicating whether or not the amount of flowing blood increases, whether or not the user is in a cold sweat, or the like, and thus measures the level of user tension while the user is parking in the current parking mode and the current parking direction. Then, the controller 180 measures and collects the level of user tension that is measured each time the vehicle is being parked, categorizes the collected levels of user tension according to the vehicle parking mode and the vehicle parking direction, and stores a result of the categorizing in a database for future use.

On the other hand, based on results of measuring the level of user tension, which are stored in the database, the controller 180 determines the level of user preference for each of the vehicle parking modes in which different vehicles are parked, and each of the parking directions in which the different vehicles are parked. For example, the controller 180 determines that the user prefers the parking mode and the parking direction in which the user is under less tension, that is, a parking mode and a parking direction, in each of which the measured level of tension is lower than that in the other parking modes and the other parking directions. Then, based on the result of the determination, the controller 180 selects at least one parking mode and one parking direction that the user prefers, from among the multiple parking modes and the multiple parking directions, respectively. Alternatively, the controller 180 may determine order of preference for each of the multiple parking mode and each of the parking directions, based on the level of user preference, that is, the level of tension that is determined in this manner.

On the other hand, when the parking mode and the parking direction that the user prefer are selected, at the request of the user, the controller 180 provides the user with the information on the parking lot where the vehicle can be parked in the parking mode and the parking direction that the user prefers. That is, the controller 180 senses whether or not the user makes a request for the parking lot (Step S404). For example, in a case where the user applies a touch input to a display unit 151 provided to the wearable device 100, the display unit 300 provided within the vehicle, or a predetermined position in the vehicle, for example, such as a windshield glass, the controller 180 may sense this, and may determine that the user makes a request for the information relating to the parking lot.

Then, when as a result of the sensing in Step S404, it is sensed that the user makes a request for the information relating to the parking lot, the pieces of information relating to the parking lots around the user are provided according to the parking mode and the parking direction that are selected in Step S402 or according to the order of preference (S406). For example, the controller 180 outputs the pieces of information relating to the parking lots as visual information. To do this, the controller 180 uses the display unit 300 provided within the vehicle or the display unit 151 provided to the wearable device 100. Of course, the controller 180 may use at least one portion of the front windshield glass 302 of the vehicle in order to provide the user with the pieces of information relating to the parking lots. Furthermore, of course, the controller 180 may provide the user with the information relating to the parking lot not only in the form of visual information, but also in the form of audio information that is output through a sound output unit 152 of the wearable device 100.

On the other hand, in Step S406, various types of pieces of information relating to the parking lot are provided to the user. For example, in a case where a parking lot where the vehicle has been parked in the past is present around a current place where the user makes a request for the information relating to the parking lot information, the controller 180 provides the user with information relating to such parking lot. At this point, in a case where the multiple parking lots where the vehicle has been parked in the past are present, based on the parking mode and the parking direction that the user prefers, which is determined in Step S402, the controller 180 provides the user with information relating to at least one among the parking lot where the vehicle has been parked, or provides the use with the pieces of information that are arranged in an orderly manner according to the order of preference for the parking mode and the order of preference for the parking direction.

On the other hand, of course, the pieces of information relating to the parking lots may be provided through an external different server. For example, the controller 180 may extract the pieces of parking lot information relating to the parking mode and the parking direction that the user prefers from among the pieces of parking lot information that are collected by the information service center 340, and may provide the user with the pieces of extracted information. For example, the pieces of parking lot information that are collected by the information service center 340 include pieces of information that are provided by an associated company, that is, a company engaged in doing parking business, such as a company that manages a parking place, and pieces of information that are provided by the company that provides a parking-related service according to the embodiment of the present invention. Alternatively, the pieces of parking lot information may be generated based on recommendation information or opinion information that are collected from different drivers. In this case, of course, the user can select any one from among the pieces of information that are collected from different drivers or the pieces of information that are provided by the associated companies, and can be provided with the parking lot information relating to the parking mode and the parking direction that he/she prefers.

Figure 5:
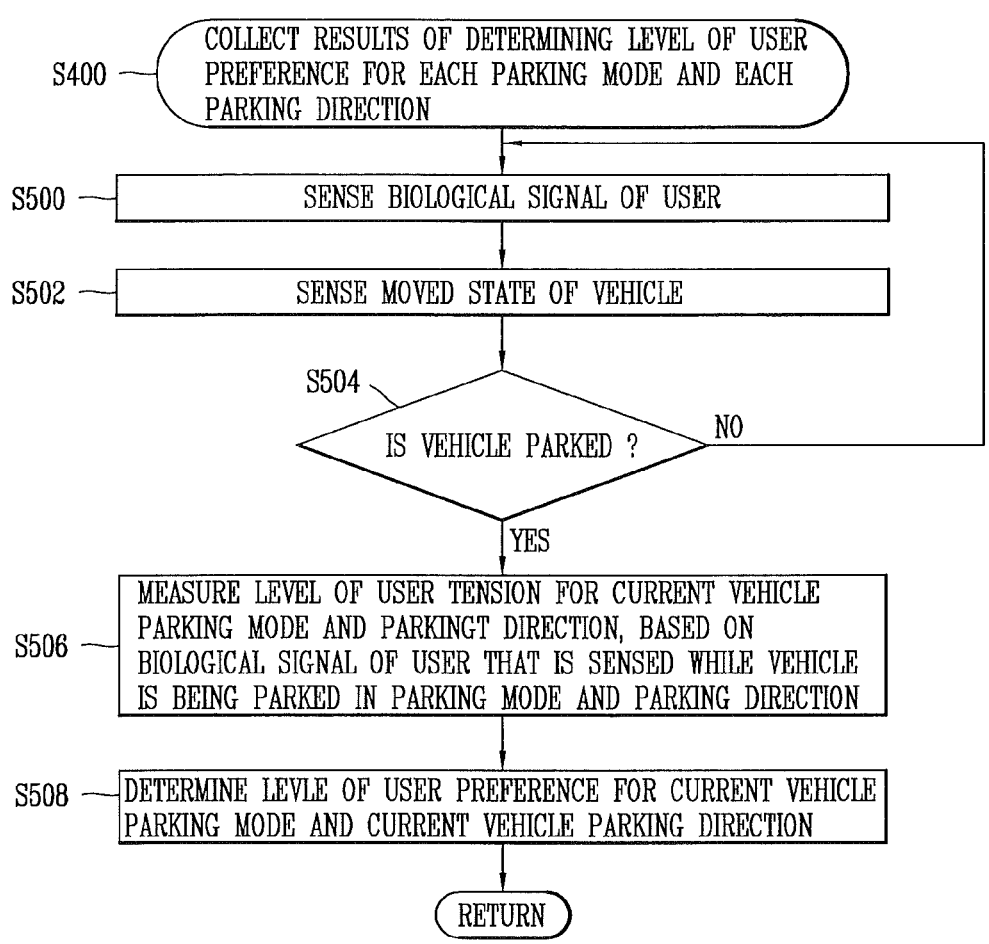
FIG. 5 is a flowchart illustrating an operational process in which a result of determining a level of user preference for each parking mode and each parking direction are collected by the smartwatch according to the present invention.

FIG. 5 illustrates in more detail an operational process in which results of determining the level of user preference for each of the parking modes and each of the parking directions are collected in the smartwatch according to the present invention.

Referring to FIG. 5, in a case where the user drives a vehicle, the controller 180 according to the present invention senses the biological signal of the user (S500). For example, the controller 180 determines whether or not the user is a driver who currently drives the vehicle, based on whether or not the vehicle that user currently gets in is a vehicle of which a designated drive is the user, or on a position of a vehicle seat that the user who wears the wearable device 100 sits down on. Then, in a case where it is determined that the user is a driver who currently drives the vehicle, the controller 180 senses the biological signal of the user that is sensed through the sensors of the biological-signal sensing unit 144.

On the other hand, in a case where the vehicle is moved, the controller 180 senses the moved state of the vehicle. For example, as described above, the controller 180 is connected to the vehicle control unit and thus receives information on a vehicle state such as a speed at which the vehicle is moved or a direction in which the vehicle is moved. Then, the moved state of the vehicle is sensed using the information on the received vehicle state (S502).

Then, the controller 180 determines whether or not the vehicle state is a parked state, based on a result of the sensing in Step S502. For example, in a case where in a state where an engine of the vehicle is turned off, the vehicle has been in an stationary state for a predetermined period of time or longer, the controller 180 determines that the vehicle is in the parked state. Then, in a case where the vehicle is in the parked state, the controller 180 determines the parking mode and the parking direction in which the vehicle is currently parked, based on at least one among the parked state of the vehicle, the direction in which the vehicle is moved, and the tracks of the vehicle. The direction and the tracks of the vehicle are sensed while the vehicle is being parked.

For example, the controller 180 generates the tracks of the vehicle according to the state where the vehicle is moved while the vehicle is being parked, and based on the generated tracks of the vehicle, determines the parking mode and the parking direction in which the vehicle is parked. For example, in a case where the vehicle is parked in the head-in direction, the controller 180 determines that the vehicle is currently parked in the "head-in" direction. Alternatively, in a case where the vehicle is moved backwards while being parked, the controller 180 determines that the vehicle is currently parked in the "back-in" direction. In addition, in a case where the vehicle is parked in parallel with a direction in which the vehicle drives, the controller 180 determines that the vehicle is parked in the "head-in" direction (when the vehicle is moved forward while being parked) or in the "back-in" direction (when the vehicle is moved backward while being parked) in the parallel parking mode.

When it is determined in Step S504 that the vehicle is parked, the controller 180 determines the parking mode and the parking direction in which the vehicle is parked. Then, in a case where it is determined in Step S504 that the vehicle is parked, the controller 180 measures the level of user tension for the vehicle parking mode and the vehicle parking direction that are currently determined, based on his/her biological signal that is sensed while the vehicle is being parked (S506). For example, as described above, the controller 180 checks a heart rate, a body temperature, and an amount of flowing blood of the user to determine whether or not the user is under tension while parking the vehicle. At this point, in a case where the heart rate, the body temperature, the amount of flowing blood or the like is changed by a predetermined numerical value or greater, the controller 180 determines that the user is under tension, and may measure the level of user tension, based on a difference between the heart rate, the body temperature, or the amount of flowing blood that is sensed and the predetermined numerical value.

Furthermore, of course, the controller 180 may refer to a record of biological signals of the user that is pre-stored, when the level of user tension is measured based on the sensed biological signal of the user. That is, the controller 180 may compare a sensing value of the biological signal of the user that is sensed while the vehicle is being parked with an average value of the biological signal of the user, such as the heart rate, the body temperature, and the amount of flowing blood, and may determine whether or not the user is under tension and the level of tension that the user is.

On the other hand, based on the measured level of tension and on the pre-stored result of the measuring of the level of tension, which corresponds to the current parking mode and the current parking direction in which the vehicle is parked, the controller 180 determines the level of preference for the current parking mode and the current parking direction (S508). For example, the controller 180 categorizes the results of measuring the level of tension according to the multiple different parking modes and the multiple different parking directions, and calculates the average level of user tension is according to the number of times that the vehicles are parked. Then, based on the calculated level of user tension, the parking mode and the parking direction in which the user is under least tension, that is, the parking mode and the parking direction that the user prefers are selected. At this point, of course, in a case where the number of times that the vehicle is parked in a specific parking mode and in a specific parking direction is smaller by a predetermined numerical value than in different parking modes and different parking direction, the controller 180 may determine that the user intentionally avoids a specific parking mode and a specific direction and may determine the specific parking mode and the specific direction as the parking mode and the parking direction that the user does not prefer, respectively, regardless of the measured numerical value of the level of tension.

Accordingly, the controller 180 determines the level of user preference for each of the various parking modes and each of the various parking direction. Based on the level of user preference, in Step S402, the controller 180 selects the parking mode and the parking direction that the user prefers.

On the other hand, when the parking mode and the parking direction the user prefers in this manner, as the request of the user, the controller 180 provides the user with the information relating to the parking lot information relating to the parking mode and the parking direction that the user prefers, when the user requests.

Figure 6:
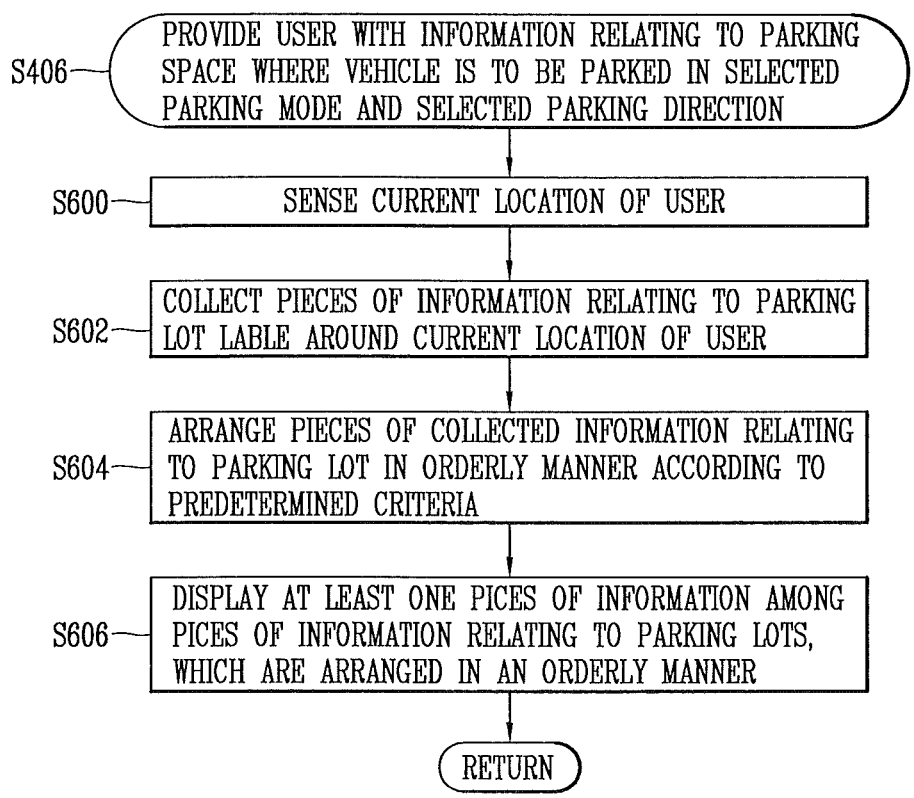
FIG. 6 is a flowchart illustrating an operational process in which the information relating to the parking lot is provided to a user by the smartwatch according to the present invention.

FIG. 6 illustrates an operational process in which the information relating to the parking lot is provided to the user by the smartwatch according to the present invention.

Referring to FIG. 6, in a case where it is determined in Step S404 that the user makes a request for the information relating to the parking lot, the controller 180 of the wearable device 100 according to the present invention senses a current location of the user (S600). Then, the controller 180 collects the pieces of information relating to parking lots that are available around the current location of the user that is sensed in Step S600 (S602). In Steps S602, in a case where the record shows that the user has parked the vehicle around the sensed current location of the user in the past, the controller 180 collects the information relating to the recorded parking lot where the vehicle has been parked. Alternatively, in Step S602, the controller 180 may request a predetermined external server to transmit pieces of information relating to the parking lots around the currently-sensed location of the user and may collect the pieces of information that are transmitted from the server.

On the other hand, when in Step S602, the pieces of information relating to the parking lots around the current location of the user are collected, the controller 180 categorizes the collected pieces of information relating to the parking lots according to predetermined criteria for orderly arrangement and arranges the categorized pieces of information in an orderly manner (S604). For example, the controller 180 categorizes the collected pieces of information based on the parking mode and the parking direction (Step S402) that, in Step S604, are determined as a parking mode and a parking direction that the user prefers, respectively, and accordingly arranges the categorized pieces of information in an orderly manner. Alternatively, the controller 180 may categorize the collected pieces of information, based on criteria selected by the user, for example, such as the number of user recommendations, or the number of vehicles that can be parked in the parking place, and may accordingly arrange the categorized pieces of information in an orderly manner.

In a case where in Step S602, the collected pieces of information are categorized and are arranged in an orderly manner, the controller 180 provides the user with at least one piece of information among the pieces of information that are categorized and are arranged in an orderly manner (S606). For example, the controller 180 displays at least one piece of information in the form of video information, among the pieces of information are arranged in an orderly manner, on the display unit 151 provided to the wearable device 100, the display unit 300 provided within the vehicle, or on the windshield glass 302 of the vehicle. Then, in a case where any one piece of information is selected from among the pieces of information that are displayed (for example, a gesture, such as a touch input, is sensed as being applied to the displayed video information), the controller 180 further displays detailed information relating to the information selected by the user. At this point, the pieces of detailed information include navigation information on a path to the parking lot selected by the user, information on the number of vehicles that can be parked in the parking lot selected by the user, information on a parking fee, and the like.

The operational processes by the wearable device 100 according to the embodiment of the present invention are described in detail above referring to the flowcharts.

An example in which under the control of the wearable device 100 according to the embodiment of the present invention, the pieces of information relating to the parking mode and the parking direction that the user prefers are provided to the user is described in more detail referring to the accompanying drawings. The following descriptions assume that under the control of the wearable device 100 according to the embodiment of the present invention, various pieces of video information are displayed on the display unit 300 provided within the vehicle. However, of course, the present invention is not limited to this, and the pieces of video information described below or pieces of information corresponding to the pieces of video information described below may be displayed on the display unit 151 provided to the wearable device 100. In addition, for convenience in description, the following descriptions assume that the user who wears the wearable device 100 according to the embodiment of the present invention is a driver of a vehicle.

As described above, the wearable device 100 according to the embodiment of the present invention measures the level of user preference for each of the multiple different parking modes and each of the multiple different parking directions, using the results of measuring the sensing by the biological-signal sensing unit 144 and the vehicle-state sensing unit 143. Furthermore, as described above, the controller 180 of the wearable device 100 according to an embodiment of the present invention provides the user with the information relating to at least one among the parking lots around the current location of the user, based on the level of user preference that is measured in this manner.

FIG. 7A illustrate an example in which according to the embodiment of the present invention, at the request of the user, the information relating to the parking lot around the user is displayed.

First, referring to the first drawing of FIG. 7A, the wearable device 100 according to the present invention determines whether or not the user makes a request for the information. That is, as illustrated in the first drawing of FIG. 7A, the controller 180 determines whether the user makes a request for the information relating to the parking lot, through a menu screen 700 that is displayed on the display unit 300.

Then, in a case where as a result of the determination, the user makes a request for the information relating to the parking lot, the parking mode and the parking direction that the user prefers are selected. In this case, the controller 180 displays on the display unit 300 the result of measuring the level of user preference for each of the already-measured multiple different parking modes and each of the already-measured multiple different parking directions, in which case the parking modes and the parking directions are displayed on the display unit 300 in decreasing order of the level of user preference for the parking mode and the parking direction. The second drawing of FIG. 7A illustrates an example of this.

That is, for example, in a case where it is determined that the user is under least tension while parking in the parallel parking mode, the controller 180 selects the parallel parking mode as a parking mode that the user prefers most. Then, the controller 180 arranges the parking modes in an orderly manner in increasing order of the level of user tension, based on the level of user tension, which is measured while the vehicle is being parked in each of the parking mode and the parking direction. In a case where the user is under less tension while parking in the parallel parking mode and in the head-in parking direction than while parking in the parallel parking mode and in the back-in parking direction, as illustrated in the second drawing of FIG. 7A, the controller 180 displays the video information 710, in which items corresponding to different parking modes are arranged in an orderly manner, on the display unit 300, as follows: "1. Parallel parking mode," "2. Perpendicular parking mode and Head-in parking direction," "3. Perpendicular parking mode and Back-in parking direction."

On the other hand, in a case where the parking mode and the parking direction that the user prefers are selected, the controller 180 collects pieces of information relating to a parking lot that is available around a current location of the user. To do this, the controller 180 uses pieces of information that are collected from different drivers, pieces of information that are collected from companies engaged in doing parking business, which are stored in an external server, or pieces of information in the record that has been acquired when the vehicle have been parked in the past.

In this case, as illustrated in the third drawing of FIG. 7A, the controller 180 displays video information 720 that alerts the user the current location of the user and video information 730 for displaying information relating to at least parking lot, on the display unit 300. At this point, when displaying the information relating to the parking lot, the controller 180 categorizes the collected pieces of information relating to the parking lots, based on the parking mode and the parking direction that the user prefers, and accordingly arranges the categorized pieces of information in an orderly manner for displaying on the display unit 300.

That is, as illustrated in the second drawing of FIG. 7A, in a case where the parking mode that the user prefers most is the "Parallel parking mode, 732" the control 180 arranges pieces of information relating to the parking lots that are collected based on the "Parallel parking mode," a parking mode that the user prefers most, in an orderly manner, and displays the pieces of information arranged in an orderly manner on the display unit 300. At this point, the controller 180 determines order of priority in which the collected pieces of information relating to the parking lots are displayed, using various criteria. For example, the controller 180 may assign the highest priority level to the information relating to the parking lot that has the largest number of spaces where the vehicle can be parked in the parking mode that the user prefers, that is, in the parallel parking mode, among the collected parking lots. Alternatively, the controller 180 may assign the highest priority level to the place nearest the current position of the user, among the parking lots where the vehicle can be parked in the parallel parking mode. Alternatively, the controller 180 may assign the highest priority level to the parking lot that are most recommended, as the parking lot suitable for the parking in the parallel parking mode, by other drivers.

On the other hand, as illustrated in the third drawing of FIG. 7A, the pieces of information relating to at least one parking lot suitable for the parking mode and the parking direction that the user prefers most are displayed on the display unit 300 according to the priority level that is determined in this manner. In a case where in this state, the user selects any one from among the pieces of information relating to the displayed parking lots, the controller 180 displays detailed information on the pieces of information relating to the currently-selected parking lot on the display unit 300. For example, the controller 180 may display information relating to the number of vehicles that can be parked in the parking mode that the user prefers most, that is, in the parallel parking mode, in the currently-selected parking lot, on the display unit 300, or may display a path to the parking lot selected by the user on the display 300. The forth drawing of FIG. 7A illustrates an example in which information on the path to the parking lot selected by the user is displayed in this manner on the display unit 300.

On the other hand, as described above, the wearable device 100 according to the present invention may display the video information on the display unit 300 provided within the vehicle or on the windshield glass 302 of the vehicle. The first drawing of FIG. 7B and the second drawing of 7B illustrate an example of this.

That is, in a case where it is possible to display the video information on the windshield glass 302, according to the present invention, the controller 180 of the wearable device 100 according to the present invention displays various of video information on the windshield glass 302 of the vehicle in conjunction with the vehicle control unit. For example, as illustrated in the first drawing of FIG. 7B, in a case where the user makes a request for the information relating to the parking lot where the vehicle can be parked, the controller 180 display video information 710 indicating a result of checking the already-collected level of user preference for each parking mode and each parking direction in which the vehicle is parked, on the windshield glass 302.

In addition, as illustrated in the first drawing of FIG. 7B, in a case where the vehicle parking mode and the parking direction that the user prefers most are selected, the controller 180 may display video information 730 including the information relating to at least one parking lot around a current location of the user, on the windshield glass 302, based on the vehicle parking mode and the parking direction that are currently selected. In addition, although not illustrated, as illustrated in the second drawing of FIG. 7B, in a case where in a state where the video information 730 is displayed, the user selects any one information relating to the parking lot, of course, the controller 180 may display the information relating to the selected parking lot on the windshield glass 302.

On the other hand, in the first drawing of FIG. 7A to the forth drawing of 7A and the first drawing of 7B and the second drawing of 7B, the example is described above in which the multiple different parking modes and the multiple different parking direction are arranged for display in an orderly manner in decreasing order of the determined level of user preference and the parking mode that are assigned the highest level of user preference is selected from among the multiple different parking modes. However, of course, the user can arbitrarily select a specific parking mode and a specific parking direction, regardless of his/her preference. In the case, the controller 180 collects pieces of information relating to a current location of the user, based on the parking mode and the parking direction that are selected by the user. In addition, in this case, of course, the controller 180 may assign the priority level to each of the pieces of information relating to the parking lots that are collected based on the parking mode and the parking direction that are selected by the user, based on predetermined criteria, such as the number of vehicles that can be parked in the parking lot, a distance from the user to the parking lot, or the number of recommendations of other drivers, and may display the pieces of information relating to the parking lots on the display unit 300 according to the priority level.

FIGS. 8A to 8C, 8D to 8F, and 8G to 8I are diagrams for describing examples of the various parking modes and the various parking directions according to the present invention.

Figure 8A:
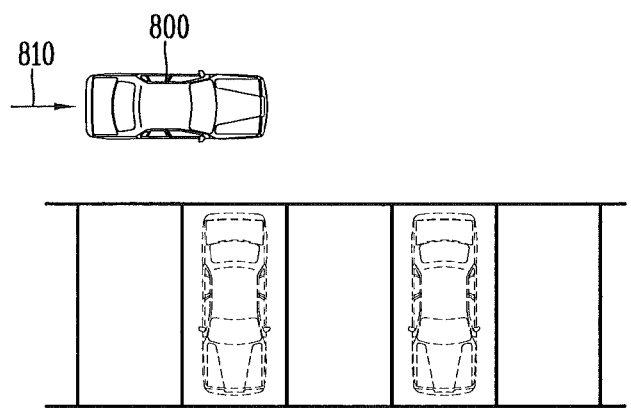
FIGS. 8A to 8C, 8D to 8F, and 8G to 8I are diagrams for describing examples of the various parking modes and the various parking direction.
Figure 8B:
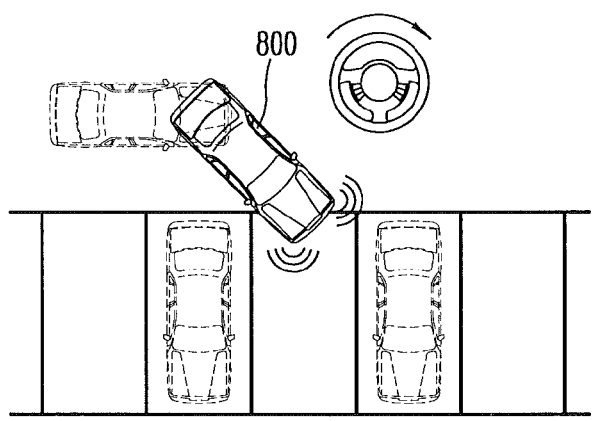
Figure 8C:
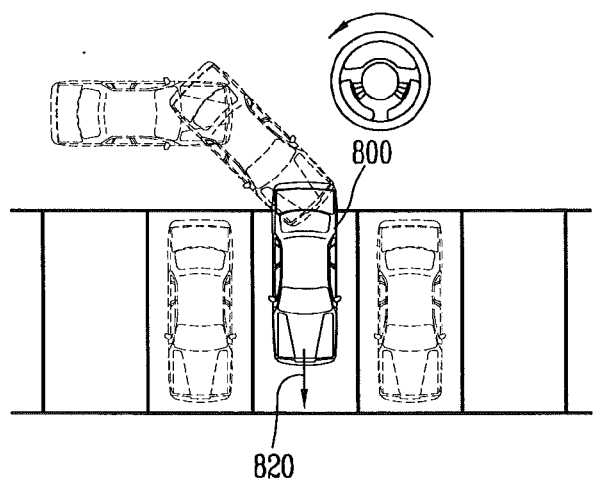

First, FIGS. 8A to 8C are diagrams for describing an example in which a vehicle is parked in the perpendicular mode and in the head-in parking direction. For example, as illustrated in FIGS. 8A to 8C, in a case where a vehicle 800 that enters a parking place and then a parking position is moved to the right or to the left to be parked in a direction 820 perpendicular to a direction 810 in which the vehicle 800 drives after entering the parking place, the controller 180 determines that the vehicle 800 is parked, in the head-in direction or in the back-in direction, in the perpendicular parking mode. Then, in a case where after entering the parking lot, the vehicle 800 is moved to the right, then is moved forward, and then is parked in the direction 820 perpendicular to the direction 810, the controller 180 determines that the vehicle 800 is parked in the "head-in parking direction" in the perpendicular parking mode.

Figure 8D:
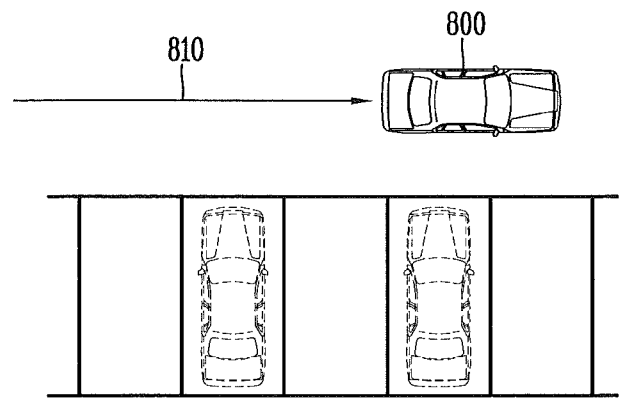
Figure 8E:
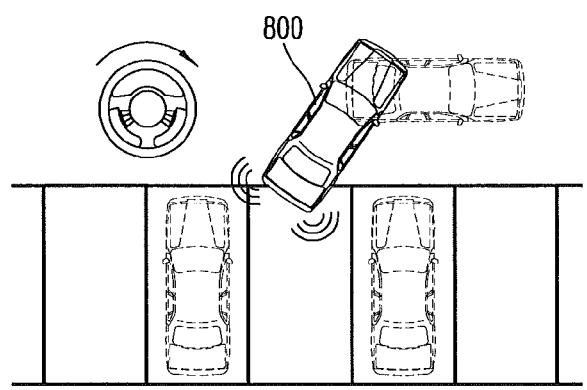
Figure 8F:
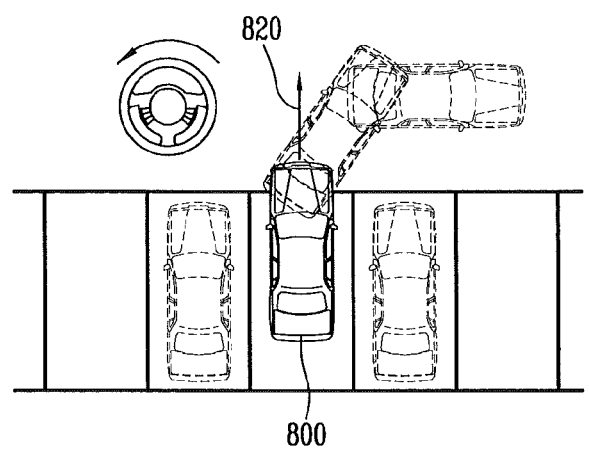

On the other hand, conversely, in a case where, as illustrated in FIGS. 8D to 8F, after entering the parking lot, the vehicle 800 is moved to the left, then is moved backward, and then is parked in the direction 820 perpendicular to the direction 810, the controller 180 determines that the vehicle 800 is parked in the "back-in parking direction" in the perpendicular parking mode.

Figure 8G:
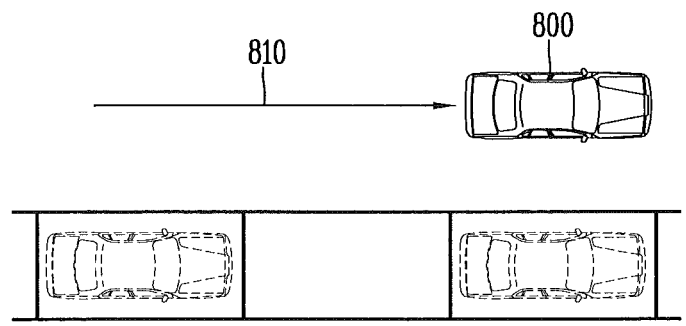
Figure 8H:
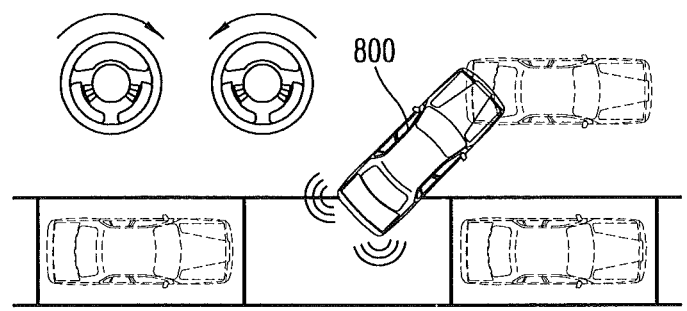
Figure 8I:
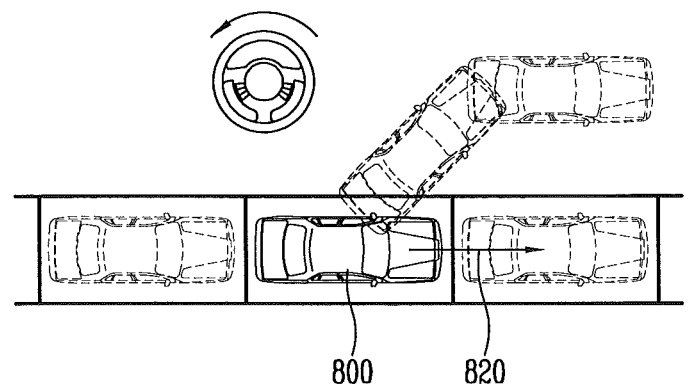

In addition, unlike in the above-described case of the parking in the head-in parking direction or the back-in direction in the perpendicular parking mode, in a case where, as illustrated in FIGS. 8G to 8I, after entering the parking lot, the vehicle 800 is moved backward and then is parked in the direction 820 parallel to the direction 810, the controller 800 determines that the vehicle 800 is parked in the back-in parking direction in the "parallel parking mode." Although not illustrated, in a case where after entering the parking lot, the vehicle 800 is moved forward and then is parked in the direction 820 parallel to the direction 810, the controller 800 determines that the vehicle 800 is parked in the head-in parking direction in the "parallel parking mode."

In this manner, the controller 180 determines the various parking modes and the various parking directions in which the vehicle 800 is parked, based on the moved state of the vehicle 800. In addition, in FIGS. 8A to 8I, the example is described in which the parking mode and the parking direction in which the vehicle 800 is parked are determined by sensing the direction according to the moved state of the vehicle 800, but of course, the parking mode and the parking direction may be determined in various ways. For example, in a case where the vehicle 800 is parked, the controller 180 may sense a state where other vehicles are parked in the vicinity and thus may determine whether the vehicle 800 is parked in the parallel parking mode, in the perpendicular parking mode, or in the angle parking mode, or whether the vehicle 800 is parked in the head-in parking direction, or in the back-in parking direction.

Alternatively, the controller 180 receives information on rotation of a steering wheel from the vehicle control unit. Of course, the controller 180 may recognize the parked state of the vehicle based on the received information, and may determine whether the vehicle is parked in the parallel parking mode, in the perpendicular parking mode, or in the angle parking mode, or whether the vehicle 800 is parked in the head-in parking direction, or in the back-in parking direction.

On the other hand, as described above, the controller 180 of the wearable device 100 according to the present invention may assign the priority level to each of the collected pieces of information relating to the parking lot according to various criteria and may display the collected pieces of information on the display unit 300 according to the priority level. Furthermore, as described above, the criteria may include the number of pieces of recommendation information, the number of vehicles that can be parked in the parking lot, and the like.

Figure 9A:
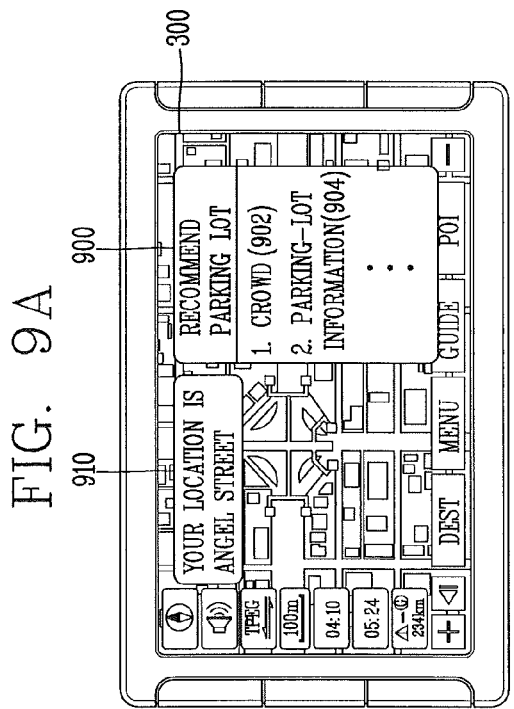
FIGS. 9A to 9C are diagrams illustrating an example in which according to the embodiment of the present invention, collected pieces of information relating to the parking lots are provided to the user in different ways.
Figure 9B:
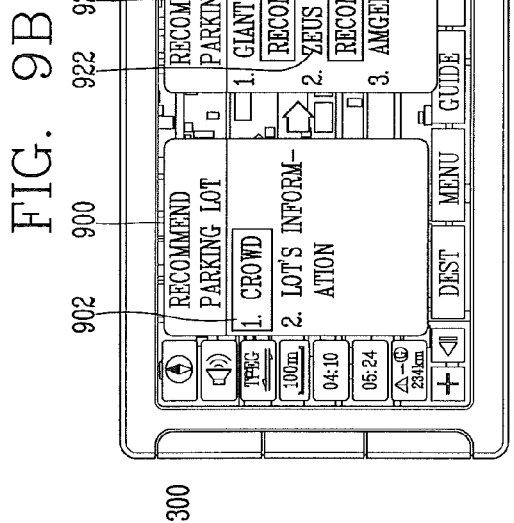
Figure 9C:
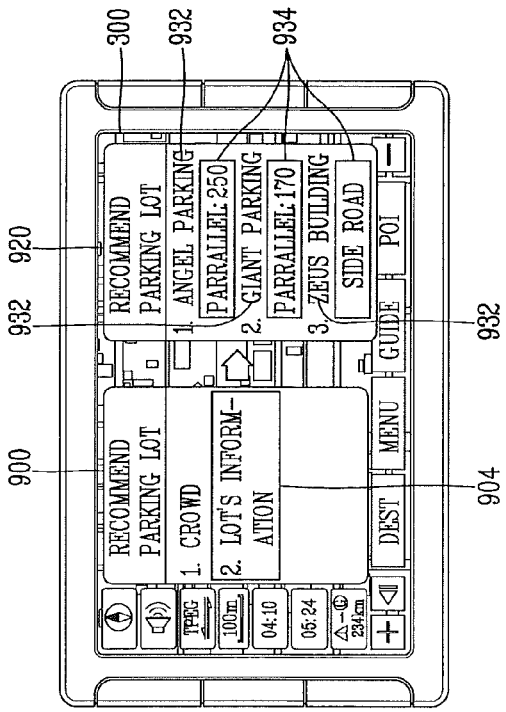

FIGS. 9A to 9C illustrate an example in which according to the embodiment of the present invention, the collected pieces of information relating to the parking lots are provided to the user in different ways.

For example, as illustrated in FIG. 9A, the controller 180 of the wearable device 100 according to the present invention displays video information 910 for alerting the user to a current location of the user and video information 900 including criteria for indicating the collected pieces of information relating to the parking lots on the display unit 300 provided within the vehicle.

For example, the criteria are broadly categorized into two types according to the collected information relating to the parking lot. That is, in a case where the pieces of information relating to the parking lots are collected from an external server, the controller 180 displays the pieces of information relating to the parking lots, which correspond to the parking mode and the parking direction that the user prefers, based on the pieces of information that are provided from the associated companies, or display the pieces of information relating to the parking lots, which correspond to the parking mode and the parking direction that the user prefers, based on the pieces of recommendation information that are collected from other drivers.

For example, in a case where the user selects "1. CROWD" from among the criteria that are displayed on the display unit 300, the controller 180 determines that the user selects the pieces of information relating to the parking lot based on the pieces of recommendation information that are collected from other drivers. In this case, the controller 180 arranges the collected pieces of information in an orderly manner in decreasing order of the number of recommendations, and thus display the collected pieces of information on the display unit 300. That is, in a case where the user selects arrangement criteria as the number of recommendations (that is, in a case where the user selects "1. CROWD" 920), the controller 180 displays the pieces of information relating to the parking lots that are collected from a predetermined external server according to the parking mode and the parking direction, in decreasing order of the number of recommendations of other drivers, on the display unit 300. FIG. 9B illustrates an example of this.

Referring to FIG. 9B, as an example, in the case of a parking lot "Giant parking," the number of recommendations of other drivers is 538, and in the case of a parking lot "Zeus Building," the number of recommendations of other drivers is 202. This indicates that in a case where as illustrated in the first drawing of FIG. 7A to the forth drawing of FIG. 7A, the parking mode that the user currently selects or that the user prefers most is, for example, the "parallel parking mode," the number of times that the other users recommend the parking lot "Giant parking" as a parking lot suitable for the "parallel parking mode" is 538, and the number of times that the other users recommends the parking lot "Zeus Building" as the parking lot suitable for the "parallel parking mode" is 202.

Accordingly, the user can select the parking lot "Giant parking" that is recommended by the greatest number of drivers, according to the parking mode that he/she selects or that he/she prefers most. In this case, the controller 180 displays detailed information relating to the parking lot "Giant parking," for example, information relating to a path to the parking lot "Giant parking," the number of vehicles that can be parked in the parking lot "Giant parking," a parking fee, and the like, on the display unit 300 or on the display unit 151 provided to the wearable device 100. On the other hand, the user can arrange the pieces of information relating to the parking lots in an orderly manner, based on the pieces of information that are collected from the associated companies, instead of based on the number of times that other drivers recommend the parking lot. That is, in a case where in FIG. 9A, the user selects "2. Lot's Information," the controller 180 may provide the pieces of information relating the parking lots, based on the pieces of information that, according to the present invention, are provided by companies that provide a parking-related service, or by companies engaged in doing parking business.

That is, the controller 180 assigns the priority level to each of the pieces of information relating to the parking lots that are received from the associated companies, based on the parking mode and the parking direction that the user prefers most. That is, as illustrated above, in the case where the parking mode that the user selects or that the user prefers most is the "parallel parking mode," the controller 180 may assign the priority level to each of the pieces of information that are received from an external server, based on the parking lot suitable for the parallel parking mode, that is, based on the parking lot that has the greatest number of spaces where the vehicles can be parked in the parallel parking mode, or on the distance from the user to the parking lot where the vehicle can be parked in the parallel parking mode. FIG. 9C illustrates an example in which in this case, the pieces of information are displayed based on the space (Parallel, side road 934) where the vehicle is parked in the parallel parking mode.

That is, referring to FIG. 9C, among the parking lots around a current location (angel street) of the user, a parking lot "Angel parking" that has the greatest number of spaces (parallel) where the vehicles (250 vehicles) can be parked in the parallel parking mode is displayed in the first place on the display unit 300 and a parking lot "Angel parking that has the next greatest number of spaces where the vehicle (170 vehicles) can be parked in the parallel parking mode is displayed in the second place on the display unit 300. Then, a parking lot "Zeus Building" is displayed in the third place on the display unit 300.

In this manner, the wearable device 100 according to the present invention provides the user with the information relating to the parking lot around the current location of the user, based on the parking mode and the parking direction that the user prefers most. At this point, as described above, the wearable device 100 according to the present invention determines the parking mode and the parking direction that the user prefers most, based on the result of sensing the biological signal of the user while the user is parking the vehicle. Thus, even though the user does not know his/her preferred parking mode and parking direction, the wearable device 100 provides the user with the pieces of information relating to the parking lot where the vehicle can be parked in the parking mode and the parking direction that the user feels comfortable with.

On the other hand, as described above, the wearable device 100 according to the present invention may be provided with the pieces of information relating to the parking lots, based on the number of times that other drivers recommend the parking lot. To do this, the wearable device 100 according to the embodiment of the present invention also may transmit to a predetermined server the recommendation information relating to the parking lot where the user parks the vehicle.

Figure 10B:
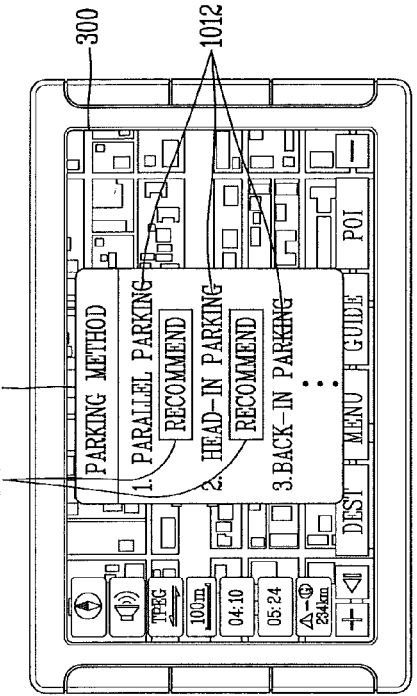
FIGS. 10A to 10O illustrate an example in which the information relating to the parking lot is collected according to the embodiment of the present invention.
Figure 10C:
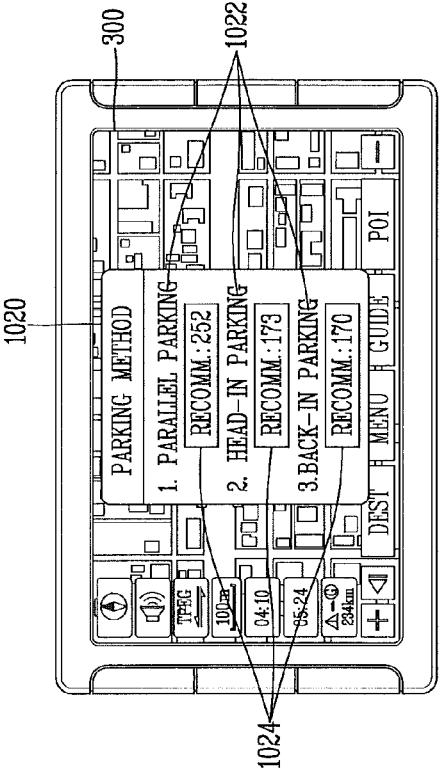
Figure 10A:
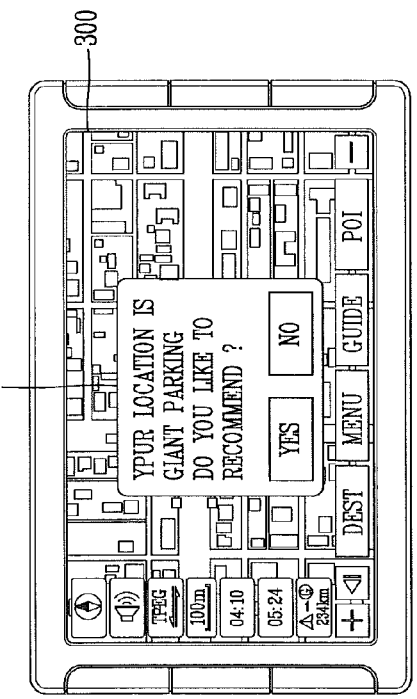

FIGS. 10A to 10C illustrate an example in which in this case, the information relating to the parking lot is collected according to the embodiment of the present invention.

For example, in a case where the vehicle is parked, the wearable device 100 according to the present invention confirms whether or not the recommendation information relating to the parking lot where the vehicle is currently parked is transmitted. That is, as illustrated in FIG. 10A, the controller 180 displays the parking lot where the vehicle is currently parked, and display a menu screen 100 through which the user confirms whether or not to recommend the parking lot where the vehicle is currently parked, on the display unit 300.

Then, in a case where the user selects recommendation of the parking lot from the menu screen 1000, the controller 180 immediately transmits to a predetermined external server the recommendation information relating to the parking lot where the vehicle is currently parked. In this case, the controller 180 transmits, to a predetermined external server, information on user's recommendation indicating that the parking lot is suitable at which the vehicle is currently parked in the vehicle parking mode and the vehicle parking direction that are currently set, that is, in the parking mode and the parking direction that the user prefers most.

In this case, the external server replies to the user's recommendation information with information relating to the current parking lot and information relating to the number of times that the other drives recommend the current parking lot. In this case, the controller 180 displays the information provided by the external server on the display unit 300. FIG. 10C illustrates an example of this.

On the other hand, of course, the controller 180 may perform control in such a manner that the user can recommend the parking lot where the current vehicle is to be parked, as being suitable for the parking mode and the parking direction other than the parking mode and the parking direction that are currently set. That is, for example, even though the user drives the vehicle into the current parking lot in order to park the vehicle in the parking mode and the parking direction that are set in advance, that is, in the parking mode and the parking direction that the user prefers most, for example, in the "parallel parking mode," the user can determine that the current parking lot is practically suitable for the other parking modes and parking directions. For this reason, the controller 180 performs control in such a manner that the user can select the parking mode and the parking direction for recommendation of the parking lot, and thus can recommend the current parking lot as being suitable for the selected parking mode and the selected parking direction other than the parking mode and the parking direction that are currently set. That is, as illustrated in FIG. 10B, the controller 180 may display on the display unit 300 a menu screen 1012 through which the user selects at least one parking mode and at least one parking direction from the multiple parking mode and the multiple parking directions, and may transmit the recommendation information indicating that the current parking lot is suitable for the selected parking mode and the selected parking direction, to the predetermined external server.

In this case, as a response to the transmission of the recommendation information, the controller 180 receives information relating to a status on other drivers' recommendation of the current parking lot. FIG. 10C illustrates an example in which the received information on the status on other drivers' recommendation is displayed. The information on the number of times that other drivers recommend the current parking lot as being suitable for a specific parking mode and a specific parking direction is displayed in the example.

Effects of the wearable device and the method of controlling the wearable device according to the present invention are described as follows.

According to at least one of the embodiments of the present invention, the parking mode and the parking direction that the user prefers are determined, and the information relating to the parking lot according to the parking mode and the parking direction that are determined is provided. This provides an advantage that the user is provided with the information on the parking lot where the vehicle can be more easily parked.

In addition, according to at least one of the embodiments of the present invention, the parking mode and the parking direction that the user prefers are determined based on a change in the biological signal of the user that is sensed while the vehicle is being parked. This provides an advantage that even though the user does not know the parking mode and the parking direction that he/she feels comfortable with, the user is provided with the information on the parking lot where the vehicle can be easily parked.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable device comprising:
    a biological-signal sensing unit configured to sense a biological signal of a user wearing the wearable device;
    a vehicle-state sensing unit configured to sense a movement state of a vehicle driven by the user wearing the wearable device; and
    a controller configured to:
        identify parking events for the vehicle driven by the user wearing the wearable device,
        determine levels of user tension for multiple different parking modes and multiple different parking directions by, for each of the identified parking events:
            determining a parking mode and a parking direction using a result of sensing by the vehicle-state sensing unit, and
            measuring a level of user tension for the parking mode and the parking direction based on the biological signal of the user that is sensed while the vehicle is being parked, and
        determine a level of user preference for each of the multiple different parking modes and each of the multiple different parking directions using the determined levels of user tension,
    wherein the controller is configured to select the parking mode and the parking direction that the user prefers based on the determined level of user preference for each of the multiple different parking modes and each of the multiple different parking directions, and provide the user with information relating to a parking space where the vehicle is able to be parked in the parking mode and the parking direction that are selected.

2. The wearable device of claim 1, further comprising a location sensing unit configured to sense a current location of the user,
    wherein the controller is configured to provide the user with the information relating to the parking space where the vehicle is able to be parked based on the current location of the user.

3. The wearable device of claim 2, wherein the controller is configured to provide the user with information relating to the parking space where the vehicle is able to be parked by:
    identifying parking lots located within a threshold distance of the sensed current location;
    selecting, from among the identified parking lots located within the threshold distance of the sensed current location, at least one suitable parking lot based on a number of times that other drivers recommend the at least one suitable parking lot as a parking lot suitable for the parking mode and the parking direction that are selected; and
    providing information relating to the at least one suitable parking lot.

4. The wearable device of claim 2, wherein the controller is configured to provide the user with information relating to the parking space where the vehicle is able to be parked by:
    identifying parking lots located within a threshold distance of the sensed current location;
    selecting, from among the identified parking lots located within the threshold distance of the sensed current location, at least one suitable parking lot based on a number of spaces where the vehicle is able to be parked in the parking mode and the parking direction that are selected; and
    providing information relating to the at least one suitable parking lot.

5. The wearable device of claim 2, wherein the controller is configured to provide the user with information relating to the parking space where the vehicle is able to be parked by:
    identifying parking lots located within a threshold distance of the sensed current location;
    selecting, from among the identified parking lots located within the threshold distance of the sensed current location, at least one suitable parking lot based on whether or not the vehicle is able to be parked in the parking mode and the parking direction that are selected and a distance from the sensed current location; and
    providing information relating to the at least one suitable parking lot.

6. The wearable device of claim 1, wherein the controller is configured to provide the user with information relating to the parking space where the vehicle is able to be parked by:
    collecting, from an external server, multiple pieces of information relating to a parking lot that includes the parking space;
    selecting, from among the collected multiple pieces of information relating to the parking lot that includes the parking space, at least one piece of information based on the parking mode and the parking direction that are selected; and
    providing the selected at least one piece of information.

7. The wearable device of claim 1, wherein the biological-signal sensing unit is configured to sense at least one of a heart rate of the user, a body temperature of the user, or an amount of blood flow of the user, and
    wherein the controller is configured to measure the level of user tension based on a change in the heart rate of the user, the body temperature of the user, or the amount of blood flow of the user sensed while the vehicle is being parked.

8. The wearable device of claim 7, wherein the controller is configured to measure the level of user tension by:
    determining that at least one of the heart rate of the user, the body temperature of the user, or the amount of blood flow of the user has changed by a particular numerical value or greater,
    determining that the user is under tension based on the determination that at least one of the heart rate of the user, the body temperature of the user, or the amount of blood flow of the user has changed by the particular numerical value or greater, and
    measuring the level of user tension based on a difference between the at least one of the heart rate of the user, the body temperature of the user, or the amount of blood flow of the user and a particular numerical value.

9. The wearable device of claim 7, wherein the controller is configured to compare the at least one of the heart rate of the user, the body temperature of the user, or the amount of blood flow of the user with an average value that is measured and determine whether or not the user is under tension based on the comparison, and wherein the controller is configured to measure the level of user tension based on a difference between the at least one of the heart rate of the user, the body temperature of the user, or the amount of blood flow of the user and the average value.

10. The wearable device of claim 7, wherein the controller is configured to categorize results of measuring the level of user tension into the multiple different parking modes and the multiple different parking directions, calculate an average level of user tension for each of the multiple different parking modes and each of the multiple different parking directions based on a number of times that the vehicle is parked, and determine a level of user preference that increases as the calculated average level of user tension decreases.

11. The wearable device of claim 10, wherein the controller is configured to determine that a number of times that the vehicle has parked in a specific parking mode and a specific parking direction is smaller than a particular numerical value relative to other parking modes and other parking directions, and determine that the user avoids the specific parking mode and the specific parking direction based on the determination that the number of times that the vehicle has parked in the specific parking mode and the specific parking direction is smaller than a particular numerical value relative to other parking modes and other parking directions.

12. The wearable device of claim 2, wherein the controller is configured to provide the user with information relating to the parking space where the vehicle is able to be parked using past parking history information for the vehicle.

13. The wearable device of claim 1, wherein the controller is configured to provide the user with information relating to the parking space that includes information on a path to at least one parking lot where the vehicle is able to be parked.

14. The wearable device of claim 1, wherein the controller is configured to display the information relating to the parking space where the vehicle is able to be parked as video information displayed on a unit connected to the vehicle.

15. The wearable device of claim 14, wherein the controller is configured to display the video information relating to the parking space where the vehicle is able to be parked on a display unit provided within the vehicle or on a windshield glass of the vehicle.

16. The wearable device of claim 1, wherein the controller is configured to determine whether or not the user is a driver of the vehicle, and wherein the controller is configured to measure the level of user tension for the parking mode and the parking direction in which the vehicle is parked based on a determination that the user is the driver of the vehicle.

17. The wearable device of claim 16, wherein the controller is configured to determine whether or not the user is the driver of the vehicle based on a result of recognizing a face through a camera provided within the vehicle, or on a result of recognizing a position of a vehicle seat on which the user sits.

18. The wearable device of claim 16, wherein the controller is configured to determine that the user is the driver of the vehicle based on the vehicle being a vehicle of which the user is a designated driver.

19. The wearable device of claim 1, wherein the controller is configured to transmit, to an external server and based on user selection, information on a user's recommendation of the parking space or parking lot where the vehicle is currently parked.

20. A method of controlling a wearable device that senses a biological signal of a user, the method comprising:

identifying parking events for a vehicle driven by a user wearing the wearable device;

determining levels of user tension for multiple different parking modes and multiple different parking directions by, for each of the identified parking events:

determining a parking mode and a parking direction based on a moved state of the vehicle, and measuring a level of user tension for the parking mode and the parking direction based on the biological signal of the user that is sensed while the vehicle is being parked;

determining a level of user preference for each of the multiple different parking modes and each of the multiple different parking directions using the determined levels of user tension;

selecting, from among the multiple different parking modes and the multiple different parking directions, the parking mode and the parking direction that the user prefers based on the determined level of user preference for each of the multiple different parking modes and each of the multiple different parking directions; and providing the user with information relating to a parking space where the vehicle is able to be parked in the parking mode and the parking direction that the user prefers.

* * * * *